United States Patent [19]
Loomis et al.

[11] Patent Number: 6,092,193
[45] Date of Patent: Jul. 18, 2000

[54] AUTHENTICATION OF ACCUMULATED INSTRUMENT DATA

[75] Inventors: Peter V. W. Loomis, Sunnyvale; David R. Gildea, Menlo Park; James M. Janky, Los Altos; John F. Schipper, Palo Alto, all of Calif.

[73] Assignee: Trimble Navigation Limited, Sunnyvale, Calif.

[21] Appl. No.: 08/865,271

[22] Filed: May 29, 1997

[51] Int. Cl.[7] .................................................. H04L 9/00
[52] U.S. Cl. ............................................ 713/193; 713/168
[58] Field of Search ........................... 380/23, 20; 705/28; 702/155; 713/168, 193

[56] References Cited

U.S. PATENT DOCUMENTS

| | | | |
|---|---|---|---|
| 4,559,637 | 12/1985 | Weber | 377/24 |
| 4,639,293 | 1/1987 | Lew | 202/205 |
| 4,665,497 | 5/1987 | Yamamura et al. | 364/561 |
| 4,682,287 | 7/1987 | Mizuno et al. | 364/561 |
| 4,710,888 | 12/1987 | Burke et al. | 364/561 |
| 4,831,438 | 5/1989 | Bellman, Jr. et al. | 380/20 |
| 5,521,815 | 5/1996 | Rose, Jr. | 705/28 |
| 5,602,987 | 2/1997 | Harari et al. | 395/182.06 |
| 5,646,994 | 7/1997 | Hill | 380/9 |
| 5,654,891 | 8/1997 | Naccache et al. | 380/23 |
| 5,774,374 | 6/1998 | Scott et al. | 702/155 |
| 5,799,083 | 8/1998 | Brothers et al. | 380/23 |
| 5,815,093 | 9/1998 | Kikinis | 340/937 |
| 5,828,751 | 10/1998 | Walker et al. | 713/175 |

OTHER PUBLICATIONS

Bruce Schneier, "Applied Cryptography: Protocols, Algorithms, and Source Code in C" 2nd edition, chapter 19, pp. 461–482, John Wiley & Sons, Oct. 1995.

"Encyclopedia of Computer Science," Anthony Ralston & Chester L. Meek, editors, pp. 604–606, Van Nostrand Reinhold Company, 1976.

*Primary Examiner*—Salvatore Cangialosi
*Attorney, Agent, or Firm*—John Schipper

[57] ABSTRACT

Methods and apparati for representing and storing a sequence of digital data values so that, once stored in memory, a data value cannot be modified, or cannot be modified without detection. Detection of subsequent data alteration may use error checksums, storage of instrument data in different data fields, data constraint relations, data encryption techniques and/or comparison of instrument identification numbers. Where data are to be stored in non-alterable form, the number of elements used in representing the sequence is reduced or minimized. A data value sequence can be supplemented by one or more additional data values that are received and similarly stored, without changing any of the sequence of data values already stored. The instrument data values can be individual readout values or can be accumulated sums of data values. Some of the methods are exact, allowing reconstruction of any data value with zero error. Other methods are approximate but are less complex to apply. These methods can be applied to numerical readout values from instruments such as odometers and electropotential meters at a selected sequence of sampling times.

17 Claims, 14 Drawing Sheets

| D | 0 | 0 | 0 | D | 0 | 1 | 1 | D | 0 | 0 | 1 | E |

14 (truncated)   53 (truncated)   36 (truncated)

FIG. 11

AUTHENTICATION OF ACCUMULATED INSTRUMENT DATA

FIELD OF THE INVENTION

This invention relates to storage of digital data in a memory that cannot be subsequently altered, or that cannot be altered without detection.

BACKGROUND OF THE INVENTION

Certain data, once received, should not be subsequently altered or modified, because of the intended later use such data. Examples include certain odometer or location coordinate data for a vehicle that may move to and stop at many locations in the course of a day or week, and received signal data that will be analyzed to determine which data, if any, was corrupted by the transmitter and/or by the transmission medium. If these data will be later downloaded from the original memory unit for processing and analysis, it is often crucial that substantially all of these data be received in unaltered form. Preferably, the data to be stored should be receivable in any of several formats and should not require human intervention (e.g., "burning" a CD ROM disk) in order to receive and store a permanent record of these signals.

Many workers have disclosed so-called permanent memory devices which often require human intervention or control in order to provide non-alterability of the data deposited in the memory. Memory devices that express (in binary format) and store odometer data by distinguishing between trip mileage and accumulated mileage for a group of trips and/or that divide a mileage value into two or more mutually exclusive groups of integers representing the greater significance bits and the lesser significance bits are disclosed by Weber in U.S. Pat. No. 4,559,637, by Dubuisson et al in U.S. Pat. No. 4,639,293, by Yamamura et al in U.S. Pat. No. 4,665,497, by Mizuno et al in U.S. Pat. No. 4,682,287, and by Burke et al in U.S. Pat. No. 4,710,888.

However, these patents do not disclose an approach that (1) allows instrument data to be formatted and stored in a modifiable memory in a manner that allows detection of subsequent data alteration, (2) minimizes the number of bits used for representation of a sequence of data values, each drawn from a wide range of values, in a non-modifiable memory, and/or (3) allows each new data value received to be added to the sequence of data values already stored, using the bits representing only the new data value and without requiring change or restatement of any data values that are already stored.

SUMMARY OF THE INVENTION

These needs are met by the invention, which provides an approach for receiving and storing most or all of a sequence odometer readings, location coordinates, instrument readings or the like ("instrument data") so that such data can be retrieved, processed and analyzed, with relatively little deviation from the data originally received for a sequence $\{t_k\}$ of selected times satisfying $t_k < t_{k+1}$. The instrument data either cannot be altered without detection or are stored in an unalterable format, referred to here collectively as "non-modifiable" format.

Where the instrument is an odometer, advantages of this invention include the ability (1) to detect whether an odometer reading has been tampered with and (2) to authenticate or confirm that no tampering has occurred. For example, the invention can be used to detect, prevent, or significantly restrict odometer rollback, and to detect whether odometer substitution has occurred.

A sequence of numerical data values $N_k = N(t_k)$, such as odometer data taken at each of a sequence of vehicle stops or signal readouts from an operating engine, is received from an instrument and is to be stored in non-modifiable format. The sequence is processed by a microprocessor that re-expresses a character set representing a data item in a form suitable for storage, possibly using a multiple data field array. Where the instrument is a vehicle odometer or similar device that produces a stream of numerical data with increasing values, the multiple data field array may include (1) distance asserted to have traveled by the vehicle; (2) total instrument operating time; and (3) time the instrument operated in one or more specified speed ranges, including one speed range from zero to a selected upper bound U1, or their analogs. These data are used in constraint equations to detect tampering.

In another embodiment, an instrument "usage" parameter and/or performance parameter, together with parameter observation time and/or instrument location at the time of observation (optional), are reported using either (i) exception reporting of an out-of-range parameter value or (ii) periodic/aperiodic reporting of a parameter value at each of a selected sequence of reporting times. Where the data are to be stored and data alteration is to be detected, the different data fields representing the instrument data are separated and stored in separate memory locations, preferably in a flash memory or multiply-reusable erasable PROM, together with checksums or other indicia that provide checks on whether a data value has been altered.

In another embodiment, a values of a data parameter are received as increments and each increment is accumulated. When the value of the accumulated increment reaches or exceeds a selected threshold, this increment is added to a sum of increments already stored to form a new sum. The value of this new sum is stored in unencrypted form in one memory location and in encrypted form in another location. If an observer wishes to determine whether any of the stored data have been altered, the system compares one or more (preferably all) values of the unencrypted stored sums with the corresponding values of the encrypted sums. If the corresponding sum values agree, the data have not been altered. If an unencrypted sum value does not agree with the corresponding encrypted sum value, data alteration has probably occurred. Data checksums may be used in place of encrypted data.

Where data are to be stored in an unalterable format, a microprocessor (1) provides an intermediate delimiter, if appropriate, between an immediately preceding data value and the present data value, (2) re-expresses or represents the present data value in a suitable form, and (3) adds the intermediate delimiter and the present data value to memory in a form that either cannot be modified or whose associated character set will clearly indicate whether the received or stored data values have been altered. The data value sequence can be stored unalterably by "burning" into a ROM-like memory the delimiter and the present data value.

Where data are to be stored unalterably in a memory, several innovative representations or re-expressions of instrument data values are developed to represent each data value exactly or approximately. A data value may be an incremental data value, representing a change in value between the preceding and present data values, or the data value may be cumulative, for example, an odometer reading on an automotive vehicle or total time an engine or motor is used. All data values have a maximum value N(max) −1, and each data value $N_k$ is expressible as a sum of values $N_k = a_{0,k} + a_{1,k} \cdot p + a_{2,k} \cdot p^2 + \ldots + a_{M,k} \cdot p^M$, where p is a selected integer $\geq 2$ and each coefficient $a_{j,k}$ (j=0, 1, ..., M) satisfies $0 \leq a_{j,k} \leq p-1$. The integer M is the smallest positive integer satisfying $N(max) \leq p^{M+1}$. Each data value $N_k$ is represented as the sequence of coefficients $S'(N_k) = \{a_{j,k}\}$ (j=0, 1, ..., J(k)), where J(k) is the largest integer less than M+1 for which $a_{j,k}$ is non-zero; that is, $a_{j,k} = 0$ for $j \geq J(k)+1$; alternatively, one can define J(k)=M. The average number of coefficients $a_{j,k}$ representing a given data value $N_k$ is as small as four for some (assumed) probability distributions on the data values $N_k$.

In a first approach for unalterable or non-modifiable data storage, a sequence of data values $N_1, N_2, \ldots, N_K$ are represented by a concatenated sequence $$S_K = \{<N_1><D><N_2><D><N_3><D> \ldots <D><N_K><E>\},$$

where <D> is a selected sequence of characters representing an intermediate delimiter and <E> is a selected sequence of characters representing an end delimiter, and neither the sequence <D> nor the sequence <E> can appear as part of or all of any data value $N_k$. In a second approach, the data value $N_k$ is replaced by a cumulative data value, and most other aspects of the first approach are retained.

In a third approach, the data value $N_k$ is represented by a truncated sequence of coefficients $S''(N_k) = \{a_{j,k}\}$ (j=M2, M2+1, ..., J(k)), where the selected integer M2 is greater than 0 but smaller than M so that the truncated sequence $S''(N_k)$ used here represents an approximation to the sequence $S'(N_k)$ and only the most significant p-bits are retained. In a fourth approach, the data value $N_k$ is replaced by a cumulative data value, and most other aspects of the third approach are retained.

Brief Description of the Drawings

FIGS. 9–11 illustrate representative sequences of data values treated according to one embodiment of the invention.

Description of Best Modes of the Invention

Figure 1:
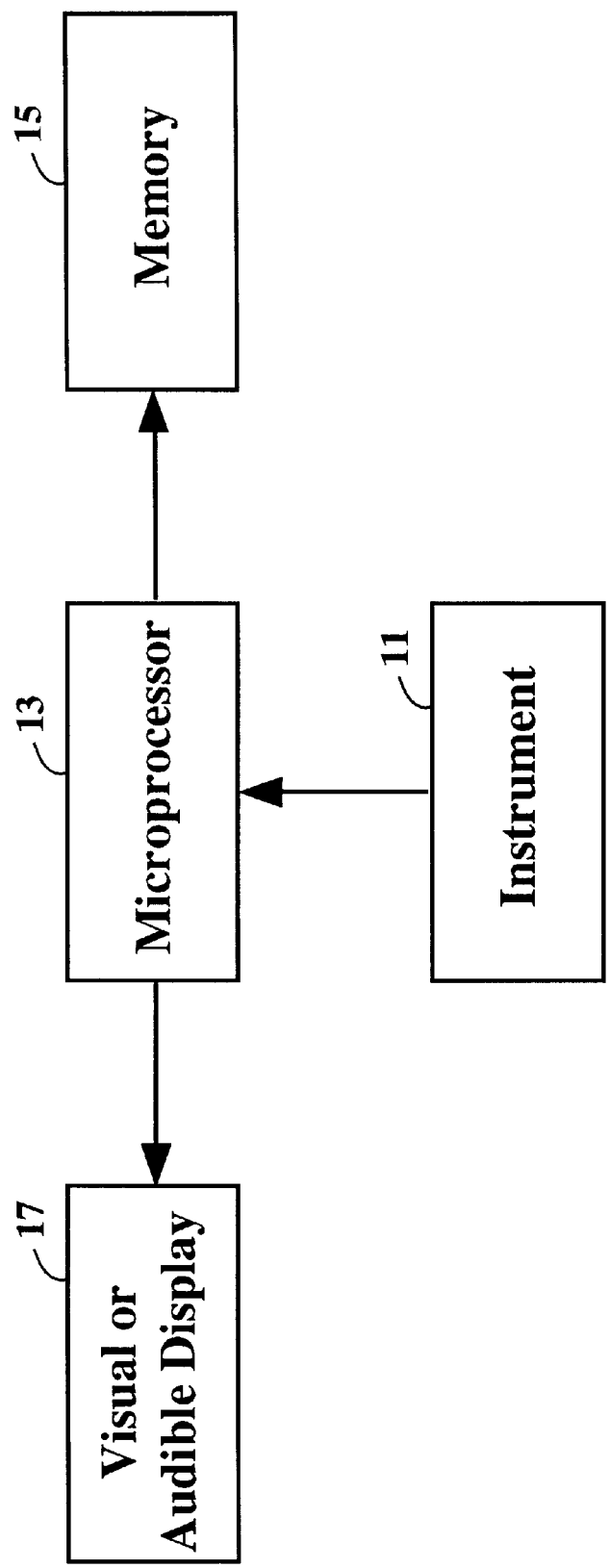
FIGS. 1 and 7 are schematic view of apparatus suitable for practicing the invention.

FIG. 1 illustrates apparatus suitable for practicing the invention in one embodiment. An instrument 11 produces a sequence of numerical data value readouts. Each of this data value sequence is received by a microprocessor 13 that is programmed to analyze and re-express or represent the received data value in a form suitable for unalterable storage in a memory module 15 that is connected to the microprocessor. Optionally, a selected data value or a selected sequence of data values received by the microprocessor 13 can be displayed by a visual or audible display 17 that is connected to the microprocessor. The microprocessor 13 may include a numerical comparator for comparing two or more numerical values and may include a numerical summer that forms a sum of numerical values presented to it.

In some of the approaches for representation of each of a sequence of data values by a character set of non-fixed length presented in the following, two consecutive data values are preferably separated by an intermediate delimiter, a consecutive set of characters that is unique and that cannot appear as part of any data value received by the microprocessor 13 from the instrument 11. In other approaches, the character set used to represent each data value has fixed length and inclusion of an intermediate delimiter is optionally deleted. Each data value received by the microprocessor 13 from the instrument 11 is promptly and automatically re-expressed, preferably as the data value is received, and entered into the memory 15 without further intervention or analysis. The information entered into the memory 15 can be either (1) a character set representing the presently received data value or (2) a character set representing an accumulated sum of data values, which may or may not be consecutive, received from the instrument 11. The memory 15 may rely upon serial EPROM or EEPROM memory units or upon flash memory units, preferably allowing at least $10^6$–$10^7$ write/erase cycles.

A flash memory may be an electrically erasable memory in which, once a value is written into one or more bytes, the corresponding memory units will continue to hold that value until these memory units are "cleared" by application of a pulse of electrical energy. After application of an energy pulse, a memory unit returns to its initial state and can be written into again. Absent application of an electrical pulse to a flash memory unit, the memory unit behaves as if the value written into it has been "burned in." A flash EEPROM system is discussed by Harari et al in U.S. Pat. No. 5,602,987 and in the references cited in this patent.

Where the instrument 11 is a vehicle or machine odometer or other instrument that measures and presents data on the fly, one concern here is to prevent presentation of spurious or "doctored" data, introduced by clipping or disconnecting wires that either measure the data or that present the measured data to a memory module for storage. A second concern is to prevent unauthorized overwriting of the measured data that are stored in the memory module. A third concern is to prevent swapping of another memory module containing incorrect data for the module containing the stored data. A fourth concern is to provide for storage in the memory module that is unalterable and that minimizes the amount of memory space allocated for each data item.

As used herein the word "usage" refers to a measure of cumulative or incremental use of an instrument that provides data. "Usage" can refer to mileage traveled by a vehicle, if the instrument is an odometer or similar instrument installed in the vehicle, and can refer to the amount of time an instrument is used or to a measure of production while the instrument is in use, if the instrument is involved in manufacturing, fabrication or production or in monitoring same.

In one embodiment of the invention, applicable to data measured on vehicle odometers and similar instruments, the instrument data are measured and presented to a memory module, preferably in at least three data fields: (1) usage U asserted to have been experienced by the instrument, for example distance traveled by a vehicle; (2) total instrument operating time OT; and (3) accumulated time AT the instrument operated in one or more specified usage rate ranges (e.g., a range of vehicle speeds), including one usage rate range from zero to a selected usage rate upper bound V1. If the instrument is an odometer or similar device, the upper bound V1 may lie in a range such as 0–7 meters/second (approximately 0–15 miles per hour). Preferably, the three data fields are stored in different sections of the memory module 15 so that alteration of data in one data field will not necessarily alter data in another data field in a consistent manner.

Each of the usage data fields may also be represented by one, two or more checksums that correspond to part or all of the data field value. In a first approach, each data field item is represented by one checksum, computed according to a check sum algorithm that is known only to one or a few certified system validation personnel. The checksum corresponding to a stored data field value is also stored in the memory module. When an observer wishes to determine if this data field value has been altered, the data field value and corresponding checksum are retrieved from memory, and a new checksum is computed using the data field value. If the new checksum and the stored checksum agree with each other, the observer may (but need not) assume that the data field value has not been altered. If the newly-computed checksum and the stored checksum do not agree with each other, this indicates that the data field value has been altered. A usage data field value may have been altered by intentional interference or tampering with that value, or the memory module or some other component may have failed at this location, causing what may be characterized as a self-alteration of the data field value.

A second approach here uses two or more checksums, each of which is calculated according to part of the corresponding usage data field value, using the same checksum algorithm or using different checksum algorithms. Each of these checksums is stored in a separate memory module location. When an observer wishes to determine whether a data field value has been altered, the data field value and each of the corresponding checksums are retrieved from memory, and checksums newly-computed from the data field value are compared with the corresponding stored checksums, by analogy with the first approach.

A third approach also uses two or more checksums, each of which is calculated according to part of the corresponding usage data field value, preferably using two or more checksums computed using different algorithms. Each of these checksums is stored in a separate memory module location. When an observer wishes to determine whether a data field value has been altered, the data field value and each of the corresponding checksums are retrieved from memory. Each checksum is compared with a checksum computed using the stored data field value and the corresponding checksum algorithm. If at least a selected threshold number of the newly-computed checksums (for example, one out of two, two out of three or three out of five) agree with the corresponding stored checksums, the data field value is accepted. If less than this threshold number of newly-computed checksums agree with the corresponding stored checksums, the data field value is assumed to have been altered.

An accumulated instrument usage reading is measured at selected times and stored on-the-fly, much as a motion picture camera simulates motion by presenting a sequence of still images taken a specified time interval apart. An incremental instrument usage reading is the change in accumulated usage measured in a selected time interval, which may be defined by two distinct events such as {instrument turned on} and {instrument turned off}.

If, within a given time interval, the instrument is asserted to have been operated for an incremental usage amount U with an operating time OT and with an accumulated time AT during which the usage rate was in the lowest speed range (usage rate V<V1), the following constraints apply to these check data $$AT \leq OT, \quad (1)$$

$$U/(OT-AT) > V1, \text{ if } AT < OT. \quad (2)$$

These constraints can be used to monitor whether any data field, especially the first data field (U), has been unauthorizedly altered. If the first, second and third data fields are altered in such a manner that the constraints (1) and (2) are still satisfied this system, acting by itself, will not detect alteration of any data field.

If the instrument 11 shown in FIG. 1 is a motor or engine that may be operated in an authorized range or in an unauthorized range (e.g., at engine speeds exceeding a preselected threshold), the system shown in FIG. 1 may also be used to monitor engine performance and to provide reports on instrument operation. For example, engine performance and/or engine speed can be monitored and reported upon in at least two ways: (1) exception reporting, wherein a report is issued, displayed, transmitted or stored only when the monitored instrument performance or instrument usage rate parameter lies in an exception range, normally a range of unauthorized operation or a range where instrument performance falls below a preselected standard; and (2) periodic reporting, wherein values of one or more reporting parameters are read at each of a selected sequence of times (periodic or non-periodic) and made available for display, transmission or storage. Preferably, instrument observation time and (optionally) instrument location are reported together with the value of the instrument performance or instrument usage rate parameter.

The reported parameter value and corresponding instrument observation time and/or instrument location are stored in memory in a manner similar to storage of the data fields (1) asserted distance traveled, (2) instrument operating time and (3) accumulated operating time outside a given range that were discussed above.

Figure 2:
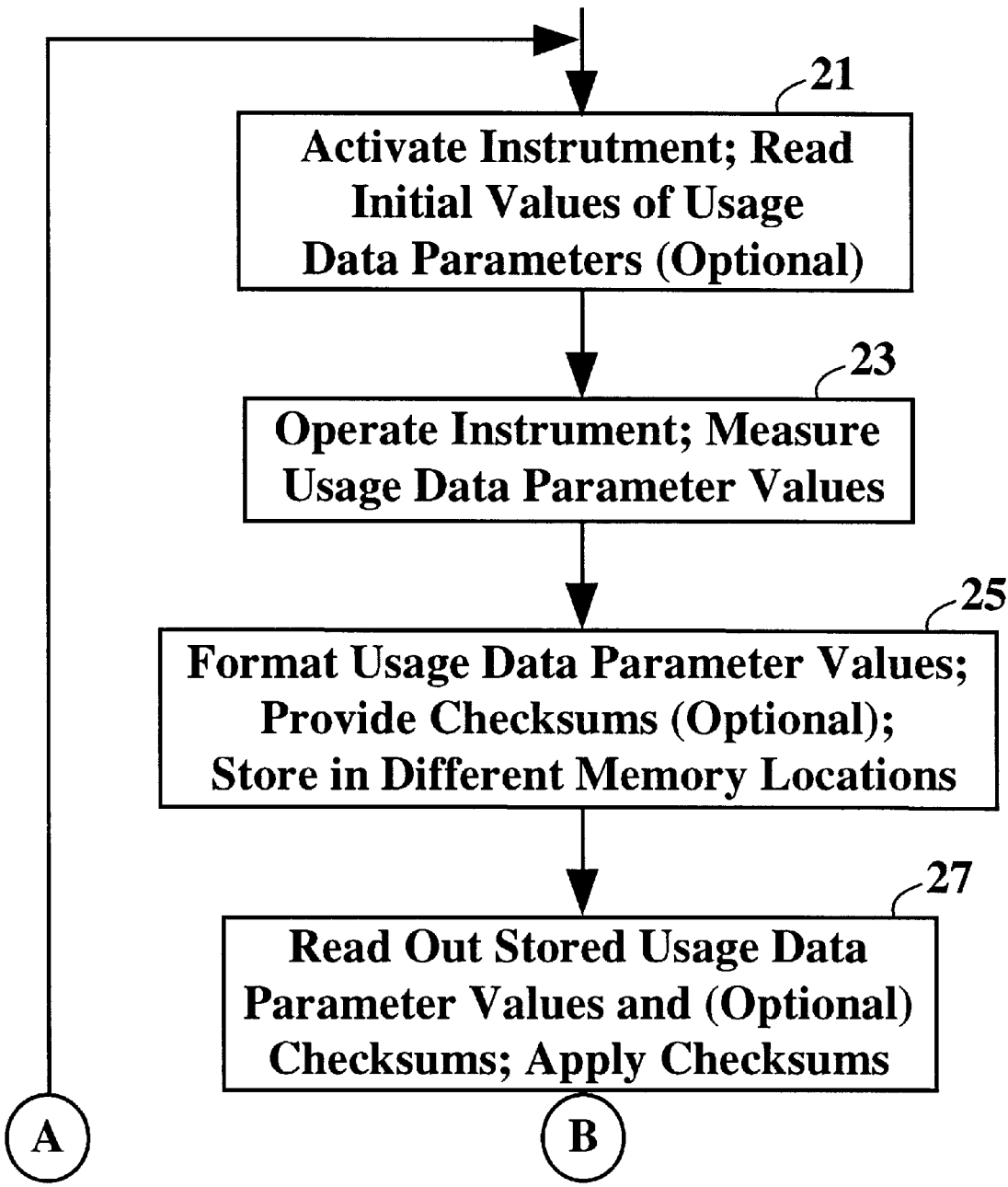
FIGS. 2–6, 8 and 12–13 are flow charts illustrating practice of the invention.
Figure 2:
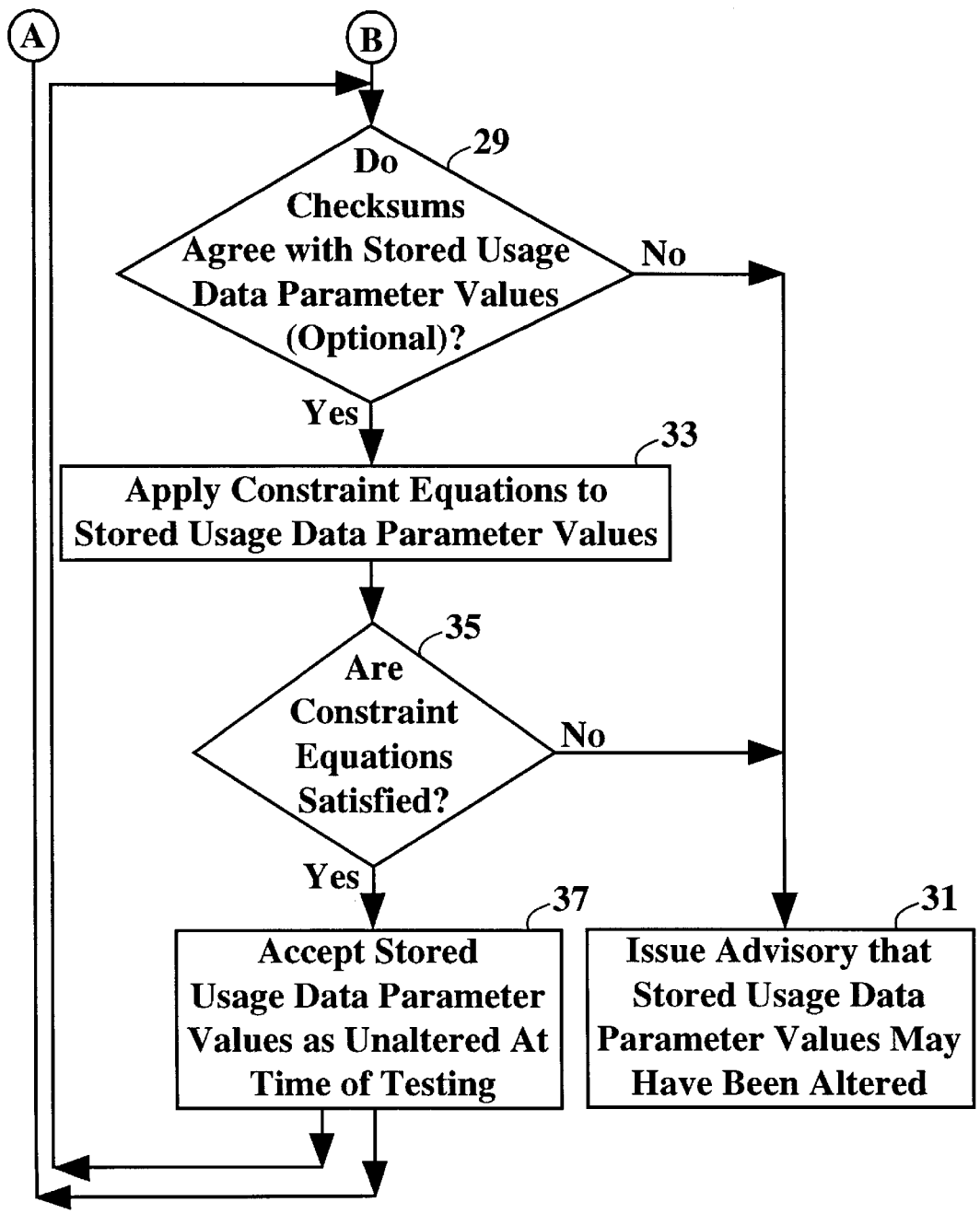

FIG. 2 is a flow chart illustrating practice of the invention according to the preceding discussion. In step 21 (optional), the instrument is activated and initial instrument usage parameter values are noted. In step 23, the instrument is operated; instrument usage rate V, operating time OT and accumulated time AT in a selected usage rate range (e.g., $0 \leq V \leq V1$ or $V' \leq V \leq V''$) are measured. In step 25, the values for one of more of the usage data parameters U, V, OT and AT are formatted, optionally provided with error-detecting checksums, and stored in different groups of locations in memory. Step 25 includes, but is not necessarily limited to, reading and storing the value of the accumulated or incremental usage parameter U when the instrument is deactivated or no longer in use.

Steps 27–41 involve monitoring for subsequent unauthorized data alteration. In step 27, appropriate usage data parameters U, V, OT and/or AT are read from memory, together with corresponding error-detecting checksums. In step 29 (optional), the stored check sums are compared with new checksums that are recomputed using the stored data parameter values. Here, the checksum tests are conducted according to the first approach, the second approach or the third approach discussed above in connection with comparison of stored checksums with newly-computed data field value checksums.

If the newly-computed checksums are consistent with the corresponding stored checksums, the system moves to step 33 and applies the constraint equations, such as Eqs. (1) and (2), to the stored usage data parameter values. In step 35, the system determines if the constraint equations are satisfied. If the constraint equations are satisfied by the usage data parameter values (step 37), the stored usage data parameter values are accepted, at the time these tests are conducted, as unaltered. In a practical system, these tests might be conducted, and the stored data re-validated, each time the usage data parameter values are to be retrieved and used. Optionally, the system can recycle to step 21 or to step 27.

If the newly-computed checksums examined in step 29 are not consistent with the stored checksums, or if the constraint equations are not satisfied, the system issues an advisory communication in step 31 that one or more of the stored usage data parameter values may have been altered (by tampering or by self-alteration) in step 41. Alternatively, the system may identify which groups of stored usage data parameter values may have been altered, if only some of these groups fail the checksum tests and/or the constraint equations tests in steps 29 and 35.

Figure 3:
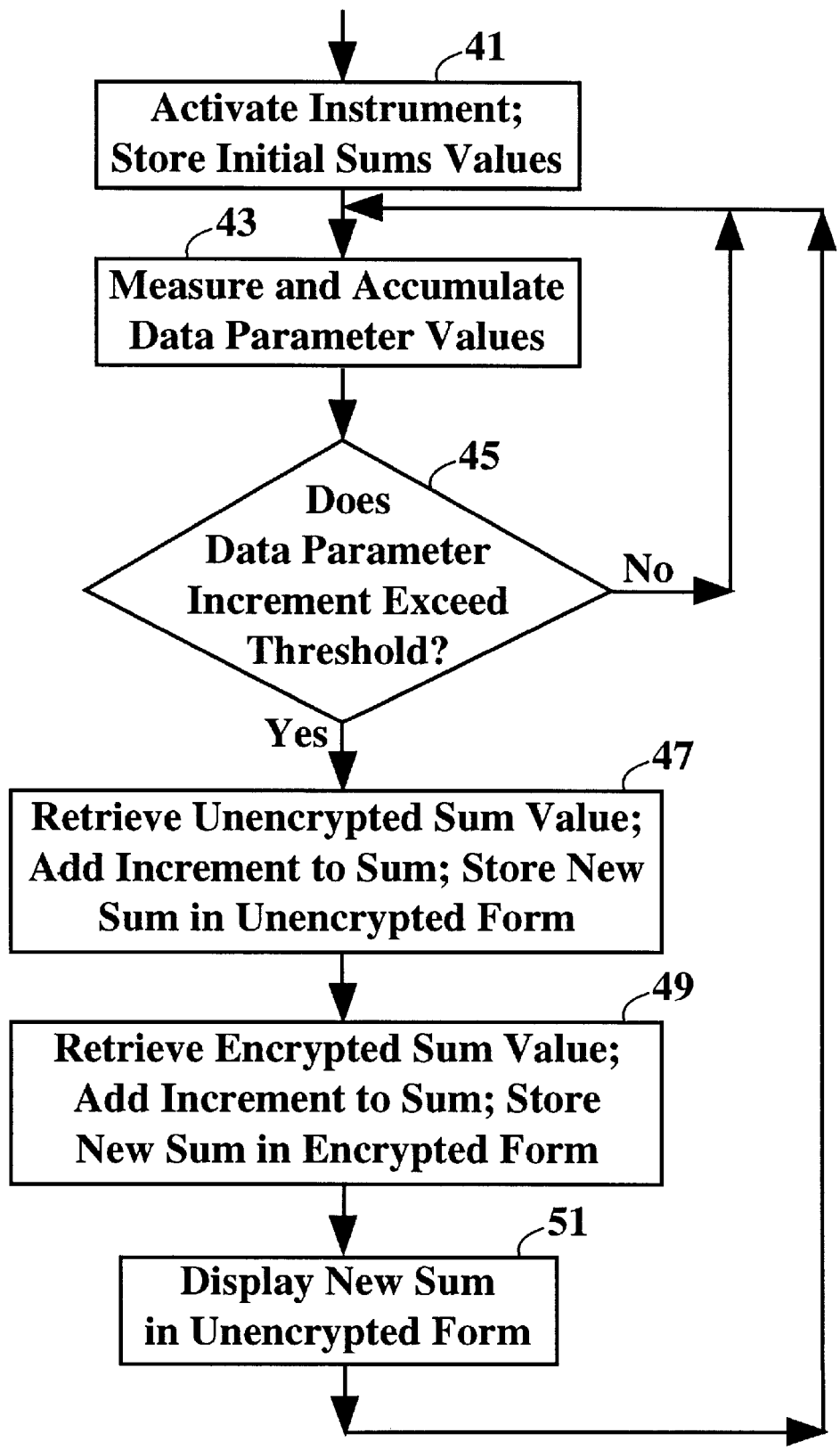
Figure 4:
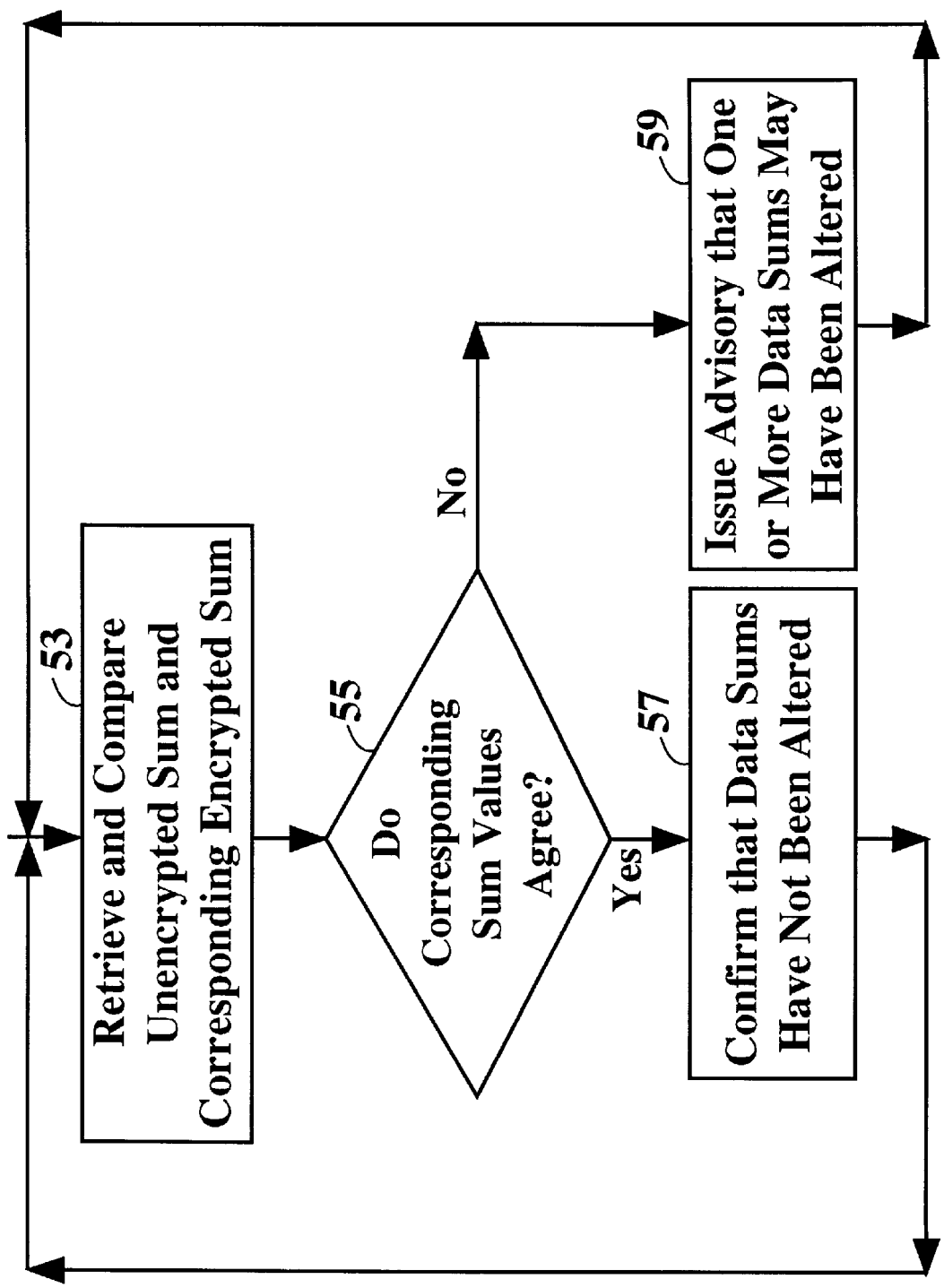

In another embodiment of the invention, illustrated in FIGS. 3 and 4, the instrument is activated, in step 41, and the system stores an initial value of a data parameter sum (which may be zero) in unencrypted form and in encrypted form. It is assumed here that the initial sum value in unencrypted form and in encrypted form agree with each other, or that any difference between these two sum values is known and accepted. In step 43, the system measures and accumulates values of a data parameter increment obtained from the instrument. In step 45 the system determines whether the value of the data parameter increment exceeds a selected threshold. If the answer to the question in step 45 is "no," the system recycles to step 43. If the answer to the question in step 45 is "yes," the system continues to step 47, where it: retrieves the unencrypted sum value; adds the new increment to the sum; and stores the new sum value in unencrypted form in memory. The system then moves to step 49, where it: retrieves the encrypted sum value; decrypts the sum value (optional); adds the new increment to the sum; and stores the new sum value in encrypted form in memory, in a different location than the location for the corresponding new sum value in unencrypted form. The system then displays the new sum in unencrypted form, in step 51 (optional) and recycles to step 43.

In a first option for this embodiment, the system stores each of the new sum values, in unencrypted form and in encrypted form, as a sequence of values in memory, or stores a selected number of the most recent sum values as a sequence in memory. In a second option for this embodiment, the system stores only the most recent sum value, in unencrypted form and in encrypted form, in memory, by overwriting the preceding (old) sum value in memory.

Assume that an observer wishes to determine whether the unencrypted data parameter values stored in memory have been altered or tampered with. In FIG. 4, using the first option, in step 53 the system compares each sum value stored in unencrypted form with the corresponding sum value stored in encrypted form. If the corresponding sum values agree with each other (step 55), the system validates the sequence of stored data parameter value increment sums, in step 57. If one or more of the corresponding sum values do not agree with each other, the system advises the observer, in step 59, that one or more of the data parameter value increments, or the sums thereof, has been altered.

If the second option is used in FIG. 4, the system compares the one stored unencrypted sum value with the one stored encrypted sum value, in step 55, so that recycling from step 57 to step 53 or from step 59 to step 53 is unnecessary.

The encryption algorithm and the encryption parameters or "keys" used to encrypt the data parameter value sums in steps 49 is assumed to be confidential and to be known only to one or a few certified system validation personnel. The encryption algorithm used here may be the Data Encryption Standard (DES), the Rivest-Shamir-Adelman (RSA) algorithm or any other suitable encryption algorithm. Numerous suitable encryption algorithms, including DES and RSA, are discussed by Bruce Schneier in *Applied Cryptography*, John Wiley & Sons, Second Edition, 1996, especially on pages 265–301 and 461–482. If an intruder attempts to alter the data parameter sum or increment values, the intruder will either: (1) alter only the unencrypted stored values, in which event discrepancies between the corresponding unencrypted and encrypted value or values will become manifest; or (2) attempt (unsuccessfully, because of the intruder's lack of knowledge of the encryption algorithm used) to simultaneously alter the corresponding unencrypted and encrypted values, in which event discrepancies between the corresponding unencrypted and encrypted value or values will again become manifest.

Figure 5:
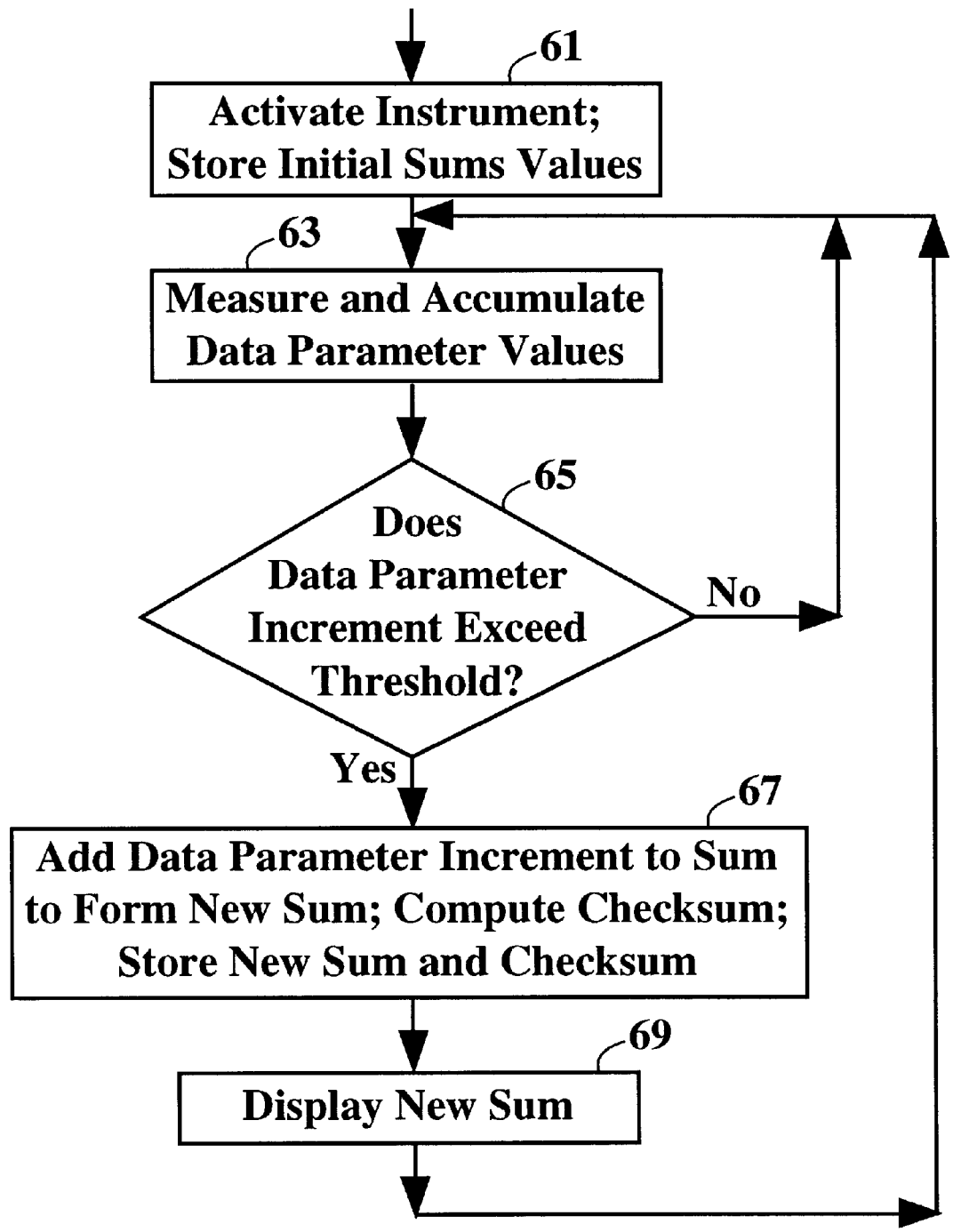
Figure 6:
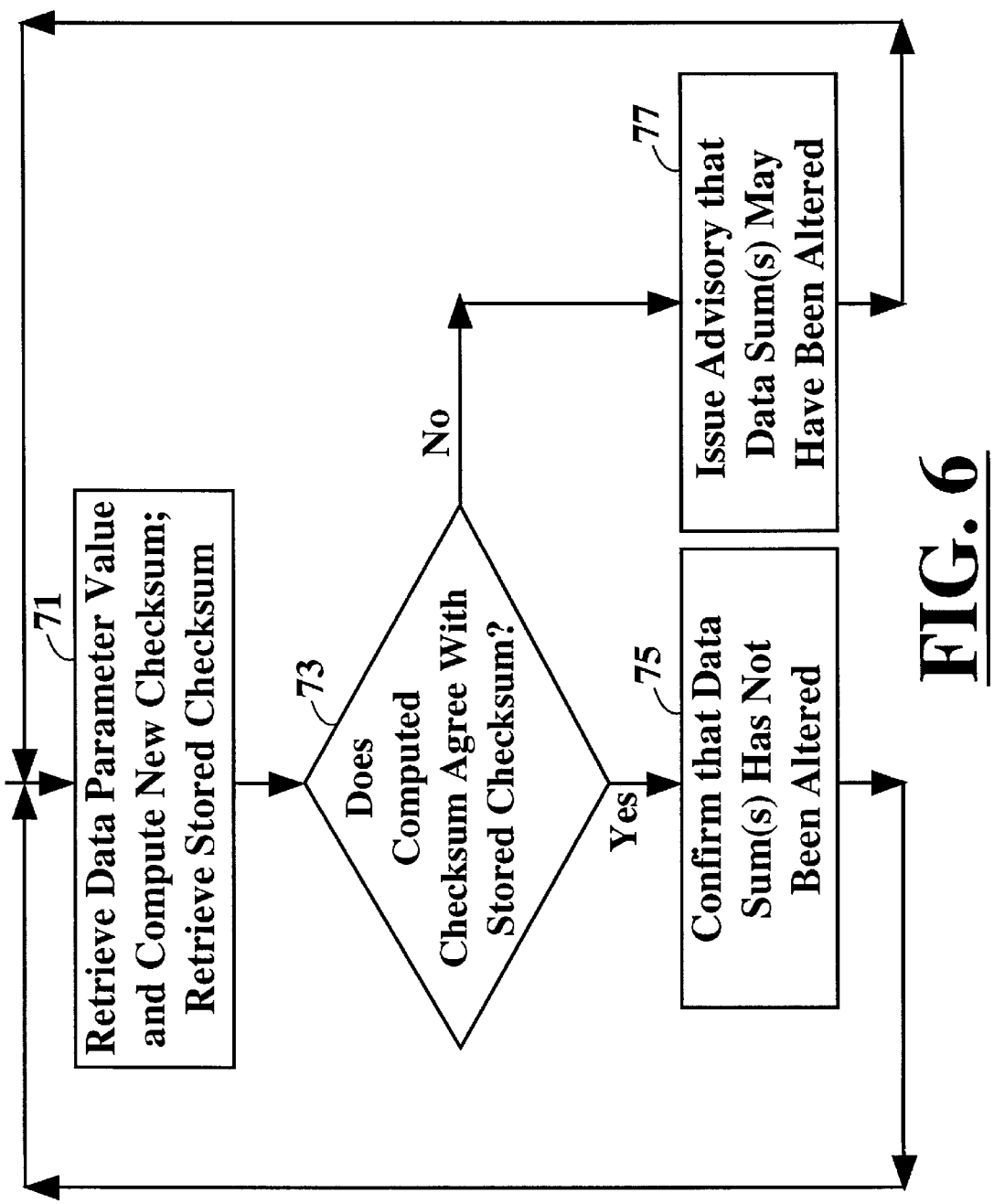

In another embodiment of the invention, illustrated in FIGS. 5 and 6, the instrument is activated, in step 61, and the system stores an initial value of a data parameter sum (which may be zero). It is assumed here that the initial sum value is known or determinable from other available information. In step 63, the system measures and accumulates values of a data parameter increment obtained from the instrument. In step 65 the system determines whether the value of the data parameter increment exceeds a selected threshold. If the answer to the question in step 65 is "no," the system recycles to step 63.

If the answer to the question in step 65 is "yes," the system retrieves the stored sum value, adds the new increment to the old sum value, stores the new sum value in memory, and computes and stores one or more checksums using either the new increment or the new sum value, in step 67. A checksum (or checksums) is computed according to one of the three approaches discussed above in connection with FIG. 2. The system then displays the new sum in unencrypted form, in step 69 (optional) and recycles to step 63.

Assume that an observer wishes to determine whether the unencrypted data parameter values stored in memory have been altered or tampered with. In FIG. 6, using the first option, in step 71 the system compares a newly-computed checksum with the corresponding stored checksum for that data parameter value. If the corresponding checksums agree (or mostly agree, using the third approach above) with each other (step 73), the system validates the sequence of stored data parameter value increment sums, in step 75. If one or more or a majority of the stored checksums do not agree with the corresponding newly-computed checksums, the system issues an advisory, in step 77, that one or more of the data parameter value increments, or the sums thereof, has been altered.

If the second option is used in FIG. 6, the system compares one or more newly-computed checksums, computed from the one stored data parameter value, with one or more corresponding stored checksums, in step 73, so that recycling from step 75 to step 71 or from step 77 to step 71 is unnecessary.

Some memory modules are constructed so that any particular bit can be written over or rewritten 100,000 times, or even more. Such memory modules are especially useful when used together with the first or second options, discussed above in connection with FIG. 4, where the most-recent M data parameter increments or sums are to be rewritten or overwritten many times Many instruments, and all automotive vehicles, have an instrument identification or serial number, referred to here as a "VIN," that appears on the instrument (the body of an auto). An auto VIN can be useful in detecting replacement of auto components. Only a few auto components, not including an odometer, are so marked; and an instrument that is not so marked is easily replaced by a substitute component, such as an odometer with a lower mileage reading than the true mileage reading.

Figure 7:
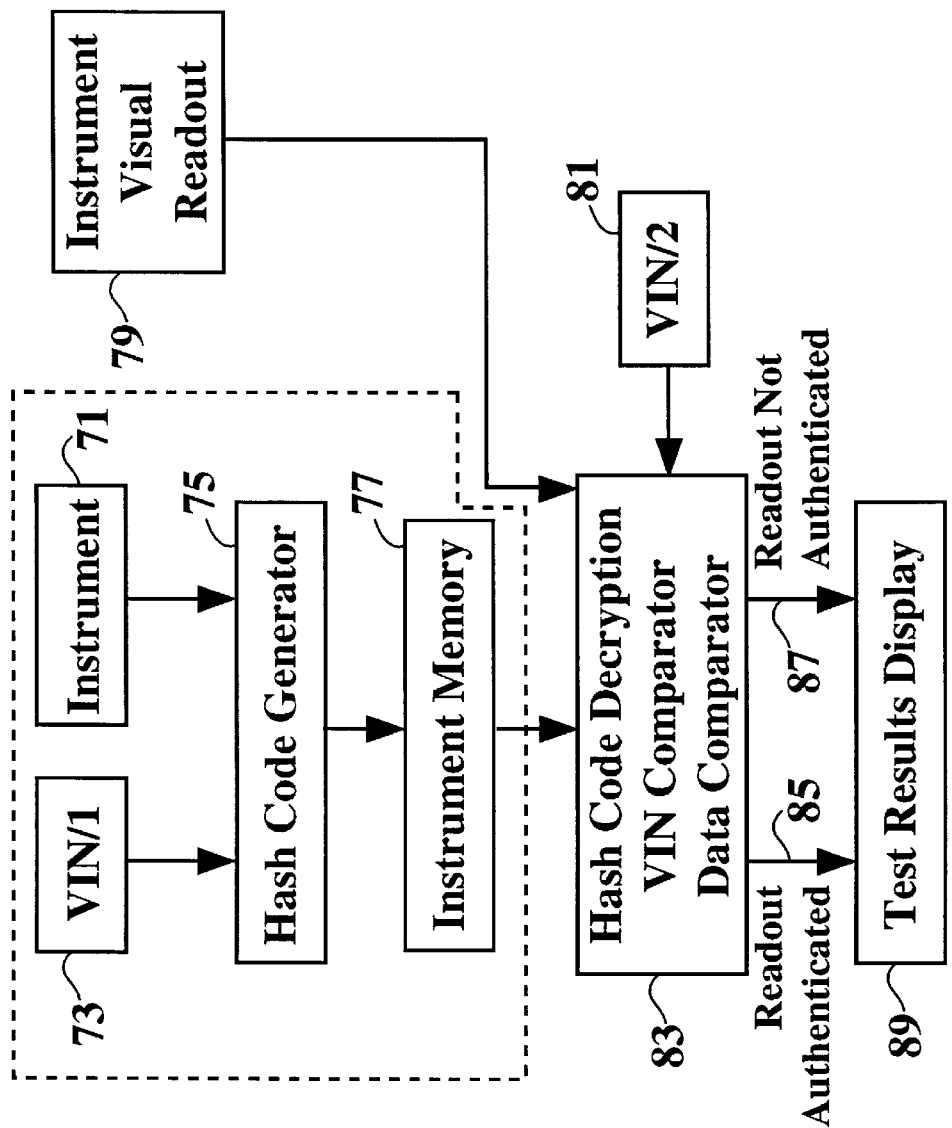

An additional layer of authentication can be provided for the data values stored in connection with an instrument having a VIN, to reduce the opportunity for such deceptive practices. In FIG. 7, data values are read directly from an instrument 71 and received by a hash code generator 75. The hash code generator 75 also receives the instrument VIN (VIN/1) from a ROM chip or other read-only device 73 that contains VIN in unalterable digital form. Using the VIN as an encryption parameter, the hash code generator 75 encrypts the data values readout received from the instrument 71 and stores the encrypted data values in an instrument data memory 77. Preferably, the ROM chip 71, hash code generator 75 and memory 77 are mechanically attached to, and not detachable from, the instrument 73, and access to the hash code generator will disable the generator. The instrument data values are also readable from an instrument visual readout device 79 or other suitable data readout device in plaintext format.

A hash code generator is a computer-related device used by a programmer to transform a first character field into a second character field, using a selected hashing key (here, the VIN/1 number or a related quantity). Hash codes are discussed by C.E. Price in *Encyclopedia Of Computer Science*, Anthony Ralston and Chester L Meek, eds., Van Nostrand Reinhold Co., 1976, pp. 604–606. The information from this article is incorporated by reference herein. Hashing may be performed, for example, (1) by forming a division remainder of a number or other alphanumeric character field, (2) by folding two or more separated parts of a character field together in different order, (3) by radix transformation from a radix or base of 2, 4, 8, 10, 16 or some other selected base to another radix, (4) by digit rearrangement, and (5) by forming the EXclusive OR or EXclusive NOR of the character field with a selected hashing key. Any suitable method of hashing may be used here.

When the plaintext data value(s) are to be tested, a certified technician enters one or more of these plaintext data values from the visual readout device 79, plus a displayed VIN, designated VIN/2, into a hash code decryption, VIN comparator and data value comparator module 83. The decrypter/comparator module 83 also receives the encrypted VIN/1 number and corresponding encrypted instrument data values from the data memory 77. The decrypter/comparator module 83 first uses the VIN/2 number as a decryption parameter to decrypt the VIN/1 number received from the data memory 77 and compares the plaintext VIN/1 and VIN/2 numbers. If these two VIN numbers agree, the comparator module 83 then decrypts the relevant instrument data value(s) stored in the data memory 77, using the VIN/1 or VIN/2 number as a decryption key, and compares these decrypted data value(s) with the plaintext data values entered from the instrument visual readout device 79. If (1) the VIN/1 and VIN/2 numbers agree with each other and (2) the relevant data value(s) from the data memory 77 and from the readout device 79 agree with each other, the system issues a validation or authentication signal on a first channel 85 and displays a message indicating that the visual readout data value(s) are authenticated or validated, on a display 89. If either the first condition or the second condition immediately above is not satisfied. The system issues a non-validation or non-authentication signal on a second channel 87 and displays a message indicating that the visually read out data value(s) are not authenticated. The channels 85 and 87 may coincide. The VIN/2 number serves the same purpose as the public key portion of a private key/public key encryption system, such as RSA.

The VIN/1 number is assumed to be unalterably entered when the instrument is fabricated and to be correct. The VIN/2 number is nominally correct, subject to verification using the system illustrated in FIG. 7. As an added precaution, the correct VIN/1 number for the instrument may also be stored confidentially on a controlled-access central computer, for example in another ROM chip. If the owner of the instrument 71 needs to verify that the displayed VIN/2 number is correct, this person would contact personnel at the central computer, present appropriate identification and instrument ownership papers, and obtain the correct VIN/1 number for use as VIN/2.

Figure 8:
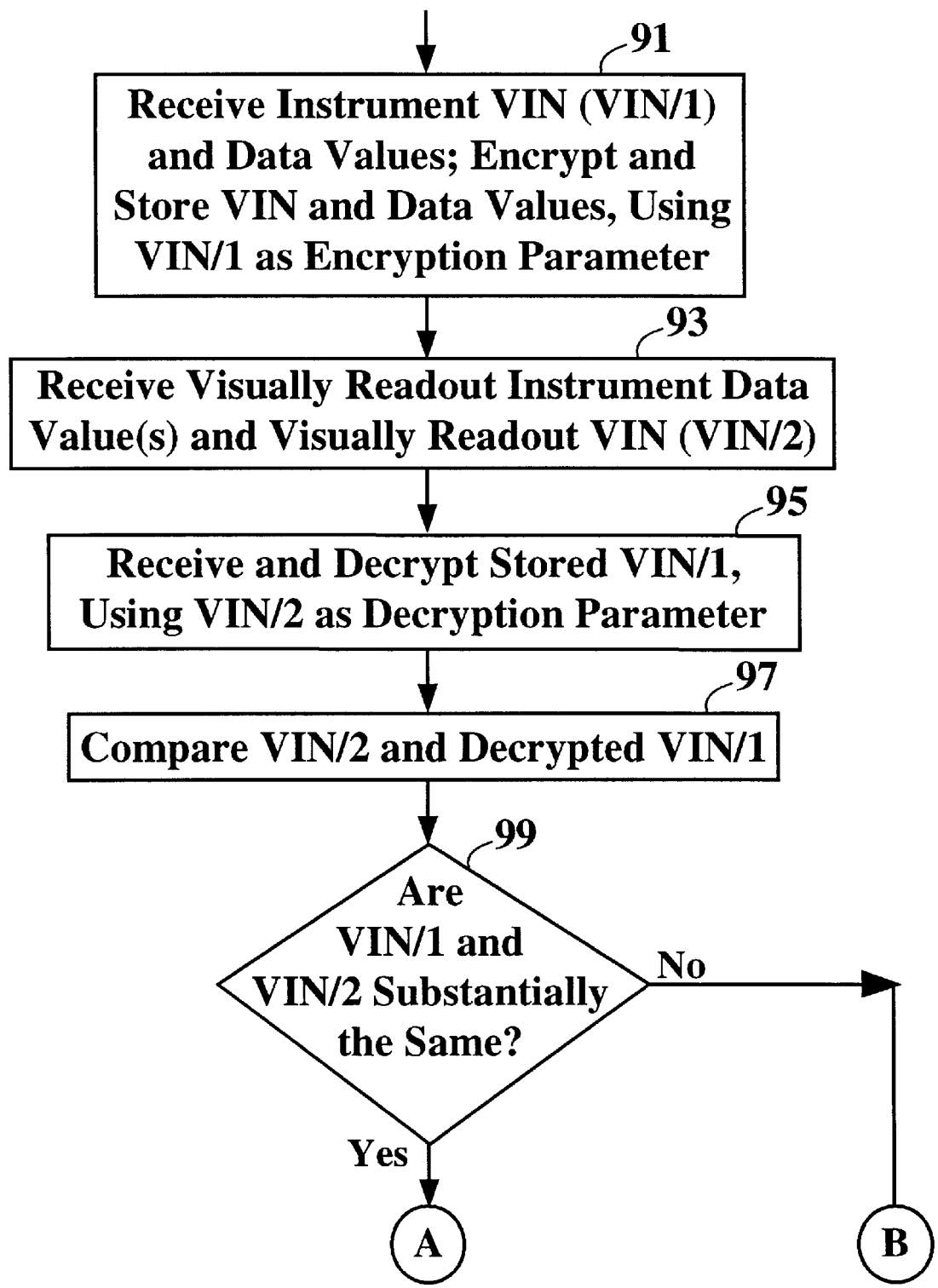
Figure 8:
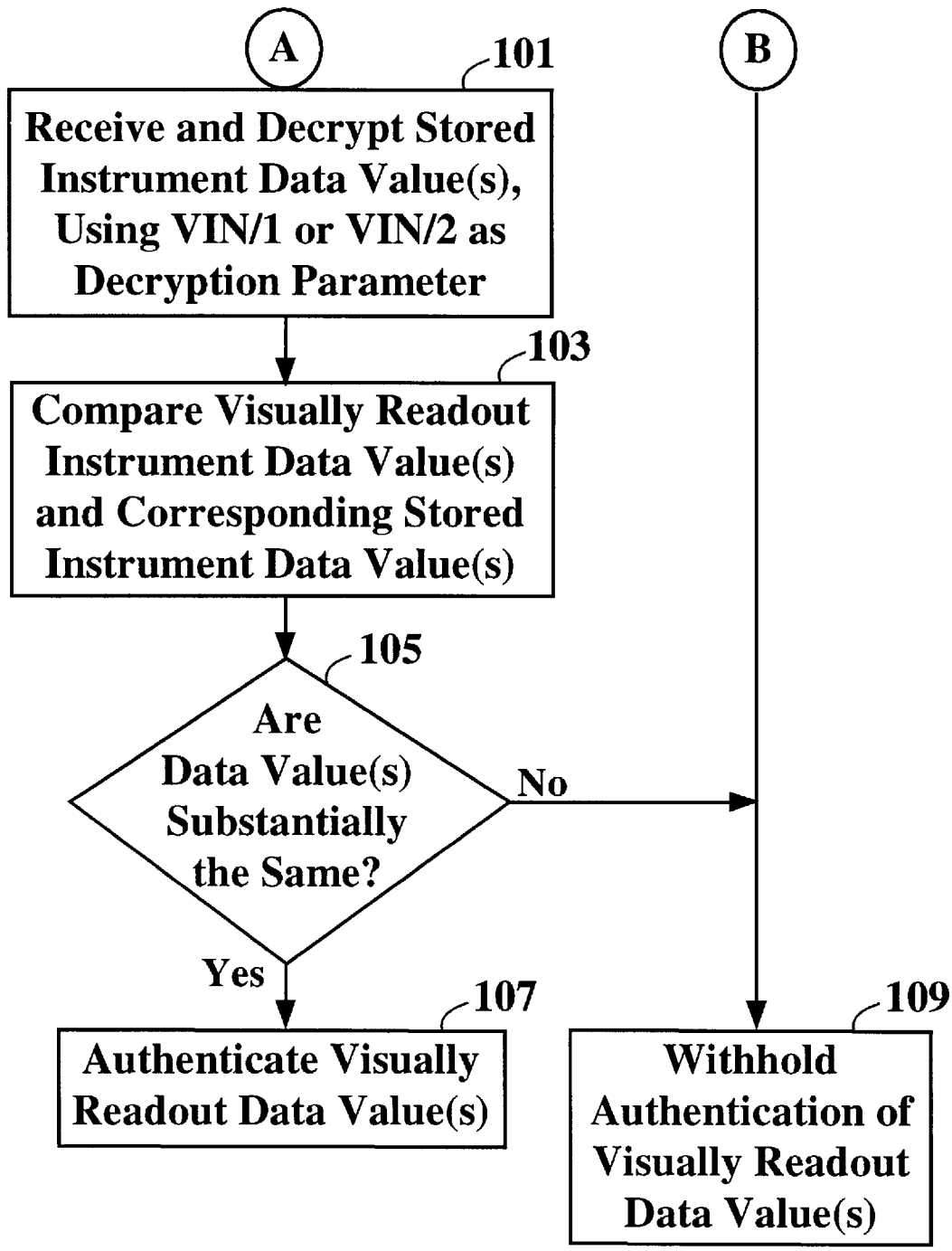

FIG. 8 is a flow chart illustrating practice of the embodiment discussed in connection with FIG. 7. In step 91, the instrument data values and VIN/1 number are received, encrypted using the VIN/1 number, and stored in memory. In step 93, the visually displayed instrument data value(s) and VIN/2 number are entered, manually or otherwise, into a decrypter/comparator device. In step 95, the decrypter/comparator device receives the stored and encrypted VIN/1 number and instrument data values and decrypts the VIN/1 number, using the VIN/2 number as a decryption parameter. In steps 97/99, the decrypted VIN/1 number is compared with the VIN/2 number. If these two VIN numbers agree with each other, the system, in step 101 and receives and decrypts corresponding stored instrument data value(s), using VIN/1 or VIN/2 as a decryption parameter. Steps 95 and 101 can be combined. In steps 103/105, the decrypter/comparator module compares the stored (now-decrypted) instrument data value(s) with the visually read out data value(s) and determines if the corresponding data value(s) agree with each other. If the corresponding data value(s) agree with each other, the system displays a validation or authentication message, in step 107. If the VIN/1 and VIN/2 numbers do not agree with each other (step 99), or if the stored data value(s) and visually read out data value(s) do not agree with each other (step 105), the system displays a non-validation or non-authentication message, in step 107.

The preceding embodiments have focused on detection of alteration of measured and stored data. Another approach to the problem of surreptitious data alteration is to "burn in" or otherwise store the data in a non-alterable format that may be read or used later. One problem faced here is the number of digital bits required to store a sequence of data values. If a memory module has a capacity of $10^6$ bytes ($8 \times 10^6$ bits), each number having seven digits (e.g., 991,602.7 miles or kilometers) will require at least 22 bits for storage in memory, not including number delimiters between adjacent numbers. At most about 364,000 seven-digit numbers can be stored before the memory capacity is exhausted, and inclusion of number delimiters will decrease this maximum number.

The four embodiments discussed in the following reduce or minimize the number of bits required to unalterably store a sequence of data values in order to provide (1) an exact indication of each data value in the sequence, or (2) an approximate indication of each data value in the sequence. This minimization is sometimes accomplished by relying upon information available from preceding data values in the sequence. If the data values form a monotonically increasing (or decreasing) sequence, additional minimization can be realized by adopting a "compact" notation to describe each data value.

Consider a sequence $\{N_k = N(t_k)\}_k$ of positive data values, for a sequence $\{t_k\}_k$ of selected times satisfying $t_k < t_{k+1}$, that is to be received and stored in an unalterable form for a sequence of times $t_k$. For convenient reference, each data unit $N_k$ is assumed here to be a positive integer. If, instead, each of the sequence of data units $N_k$ is a positive or negative integer multiple of a fixed fraction f (>0) with an associated range $-N1 \cdot f \leq N_k \leq N2 \cdot f$, where N1 and N2 are non-negative integers, a new set of data units $$N'_k = (N_k + N1 \cdot f + f)/f \qquad (3)$$

can be defined that assumes only positive integer values.

Initially, for convenience it is further assumed that each member of the sequence $\{N_k\}_k$ is bounded above by $N_k \leq N(\max)-1$, where N(max) is a positive integer. Select and fix an integer $p \geq 2$, and express the integer $N_k$ in a p-ary expression of the form $$N_k = a_{0,k} + a_{1,k} \cdot p + a_{2,k} \cdot p^2 + \ldots + a_{M,k} \cdot p^M, \qquad (4)$$

where each coefficient $a_{j,k}$ is an integer, referred to here as a "p-bit," satisfying $$0 \leq a_{j,k} \leq p-1, (j=0, 1, \ldots, M), \qquad (5)$$

and where M is the smallest integer satisfying $$N(\max) \leq p^{M+1}-1. \qquad (6)$$

For example, if the instrument is an odometer having six character spaces with p=10, N(max) is 999,999, when mileage is measured in miles or kilometers. The integer M+1 might be defined by the relation $$-(M+1) = [-\log_p \{N(\max)+1\}]_{int}, \qquad (7)$$

where $[x]_{int}$ denotes the integer part of the real number x, or the largest integer L(x) satisfying $L(x) \leq x$ (i.e., $[-3.2]_{int} = -4$ and $[+6.7]_{int} = 6$). The integer $N_k$ can thus be represented as a sequence of M+1 integers $$S(N_k) = \{a_{0,k}, a_{1,k}, \ldots, a_{M,k}\}, \qquad (8)$$

with each of these integers having one of the integer values 0, 1, 2, ..., p-1.

In working with digitally expressed numbers, it is often convenient to select $p=2^r$, where r is a positive integer, such as r=1, 2, 3, 4 or 5, although this is not required here. If the choice $p=2^r$ (or $r=\log_2 p$) is made, each coefficient $a_{j,k}$ can be expressed as an ordered sequence of r zeroes and ones, such as representation of the number $a_{j,k}=19$ in the well known equivalent binary representation $a_{j,k}=\{1,1,0,0,1\}$, for r=5, with the most significant p-bit or MSB appearing last. Another attractive choice, p=10, is used for certain measuring instruments, such as odometers, that express values as decimals.

The choices p=2 and $2^{M+1} \geq N(\max)+1$ are used here for illustrative purposes, because binary expressions are easily represented in a digital computer. With this choice, each coefficient $a_{j,k}$ (j=0, 1, ..., M) in the p-ary representation sequence $S(N_k)$ or $S'(N_k)$ of the data element $N_k$ set forth in Eq. (2) has two values, 0 and 1, as in a standard binary representation. The upper limit is N(max) is assumed to satisfy $2^{M+1} \leq N(\max)+1 < 2^{M+2}$. For example, the data value $N_k=243$ would be represented by the binary string $\{1,1,1,1,0,0,1,1\}$, which requires eight p-bits with p=2. The maximum number of p-bits required to represent any data value $N_k$ is M+1, although most data values will require substantially fewer than M+1 bits.

If one assumes that each integer $N_k$ from 1 up to $2^{M+1}-1$ appears with equal probability $p0=1/(2^{M+1}-1)$, the average or expected number n^ of bits required to represent a data value in the indicated range is found to be $$n\hat{\ }(\text{uniform}) = (M-1)/2 + ((M+1)/2)/(2^{M+1}-1)\}, \qquad (9\text{-}U)$$

which is approximately (M−1)/2 bits for M≥3. Thus, on average, about one-half of the M+1 p-bits will be required to represent the data value $N_k$ if the reduced sequence $S'(N_k) = \{a_{0,k}, a_{1,k}, \ldots, a_{J(k),k}\}$, where J(k) is the largest integer less than M+1 for which $a_{j,k}$ is non-zero; that is, $a_{j,k}=0$ for $j \geq J(k)+1$. Alternatively, of course, one can use J(k)=M and thus use the full sequence $S(N_k)$ to represent the data value $N_k$.

If one assumes that a given integer $x=N_k$ from 1 up to $N=2^{M+1}-1$ has a probability of $(1-r) r^x/(r-r^{M+1})$ of occurring for a selected value of or in the range 0<r<1), the average or expected number n^ of p-bits required to represent a data value in the indicated range is estimated as $$n\hat{\ }(\text{geometric}) = \{r+r^2+r^4+r^8+\ldots+r^{N+1}\}/(r-r^{N+1}),\text{tm} \quad (9\text{-NU})$$

which is again smaller than one-half of the M+1 p-bits used in the full sequence $S(N_k)$.

Figure 9:
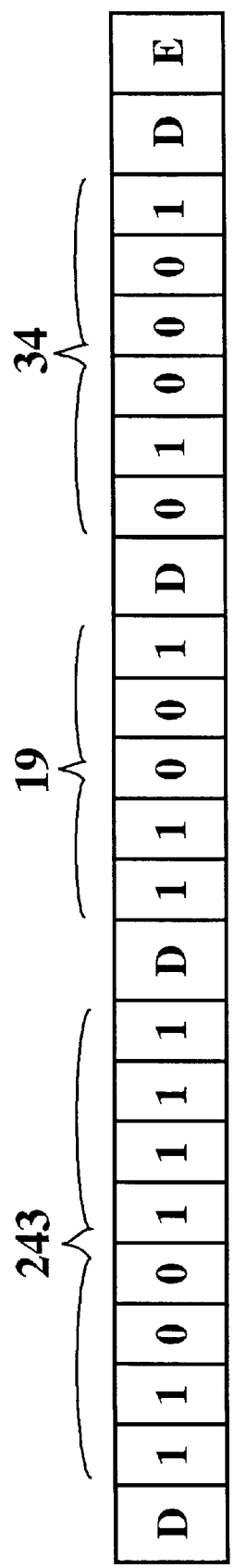

An ordered sequence of data values $N_k$ is then represented as follows. Let $<N_k>$ be the p-ary string that represents the data value $N_k$, either $S(N_k)$ or $S'(N_k)$. An ordered sequence of data values $N_k$ (k=1, 2, ..., K) is then represented in the concatenated stored data form $$S_K = \{<N_1><D><N_2><D><N_3><D> \ldots <D><N_K><E>\}, \qquad (10)$$

where <D> and <E> are a selected intermediate delimiter sequence and a selected end delimiter sequence, respectively, of p-bits (distinct from each other) that do not otherwise occur in any p-ary representation of any integer value between 1 and $2^{M+1}-1$. An ordered sequence of three data values, $N_1=243$ (11110011), $N_2=19$ (10011), and $N_3=34$ (100010), represented according to the invention with the choice p=2 or $p=2^r$, is shown in FIG. 9.

Because the intermediate delimiter sequence D will occur many times in representing the ordered sequence $S_K$ in Eq. (10), it is preferable to choose <D>≦with a relatively small number of bit positions. The number $N_k=0$ does not occur among the data values. However, binary representations such as 100 ... 0, with a one in the MSB position followed by q zeroes (1≦q≦M), do occur in the binary representation of the data values $N_k$. One suitable choice for the delimiter sequence D is a string of M+1 consecutive zeroes 000 ... 0. The end delimiter sequence E occurs once and can be chosen to be a string of M+2 consecutive zeroes, or any other suitable end delimiter sequence, with no possibility of confusion of E with either D or with the binary (p=2) representation of any data value $N_k$ ($1 \leq N_k \leq 2^{M+1}-1$). Any other suitable choices of the delimiter sequences D and E can also be made here, consistent with avoidance of any data value sequence.

Preferably, the end delimiter sequence E should be chosen so that it is a consecutive sub-sequence of the intermediate delimiter sequence D. One method of accomplishing this is to choose the sequence D so that this sequence is expressible as a concatenation of the sequence E with one or more additional integers at the end, viz.

$$\{D\} = \{<E><F>\}, \qquad (11)$$

where F is a selected fixed sequence of one or more characters, as indicated in Eq. (11). With this choice, when a new data value $N_{K+1}$ is to be added to the sequence of data values $N_1, \ldots, N_K$ already received and stored in a non-modifiable memory, the end delimiter sequence E is merely converted to the intermediate delimiter sequence D, by the process disclosed in this paragraph, in the stored sequence $S_K$, the new data value $N_{P+1}$ is concatenated with this sequence, and another end delimiter sequence E is concatenated, to form a new stored data sequence $$S_{K+1}=\{<N_1><D><N_2><D> \ldots <D><N_{K+1}><E>\}. \quad (12)$$

Note that none of the data values $N_1, \ldots, N_K$ already stored need be restored in memory. The end delimiter sequence E is converted into an intermediate delimiter sequence D, by the addition of one or more p-bit values, and the new data value $N_{K+1}$ and another end delimiter sequence E are concatenated with this modification of the original sequence $S_K$.

This approach for intermediate and end delimiter sequences <D> and <E> is counter-intuitive: Because the intermediate delimiter sequence <D> is used much more often than the end delimiter sequence <E>, which is used only once in representing a string of instrument values $N_k$, such as shown in Eq. (12), one would normally seek to use an intermediate delimiter sequence <D> that contains fewer concatenated numbers, not more concatenated numbers, than the end delimiter sequence <E>.

Alternatively, in some contexts an intermediate delimiter <D> can also be used as an end delimiter <E>. This approach can be used where the formatting of initialized bit values and data bit values in memory makes it clear where the last delimiter bits occur and initialized memory begins. In this alternative approach, no distinction need be made between the delimiters <D> and <E> in a data value sequence because it is clear where the last delimiter occurs in such a sequence.

Another embodiment receives and stores the accumulated sum of the data sequence $$\sum(K1;K2)=\sum_{k=K1}^{K2}N_k(K2\geq K1). \quad (13)$$

This approach is useful for an instrument, such as a vehicle odometer, that displays only an accumulated sum at any given time, not the individual data values $N_k$ that have contributed to the accumulated sum. For purposes of illustration, it is assumed here that K1=1. The sum $$\Sigma(k)=\Sigma(K1=1;K2=k) \quad (14)$$

is monotonically increasing with the integer k, and $\Sigma(k)$ can be represented as a p-ary expression, analogous to the representation in Eqs. (4) and (5), viz.

$$\Sigma(k)=b_{0,k}+b_{1,k}\cdot p+b_{2,k}\cdot p^2+ \ldots +b_{M,k}\cdot p^M, \quad (15)$$

$$0\leq b_{j,k}\leq p-1,(j=0,1,\ldots,M). \quad (16)$$

For a selected positive integer M1 satisfying $1\leq M1<M$, M1+1 p-bits $b_{m,k}$ (m=0, 1, ..., M1) are used to represent the number $\Sigma(k)$ up to the value $\Sigma(k)=p^{M1}-1$, using the preceding approach set forth in Eqs. (4)–(12). Each of the values $\Sigma(k)$ requires between one and M1+1 p-bits $b_{m,k}$ for this purpose. For increasing integers k for which $p^{M1}\leq \Sigma(k) < p^{M1+1}-1$, the p-bit $b_{M1+1,k}$ lies in the range $1\leq b_{M1+1,k}\leq p-1$. This p-bit $b_{M1+1,k}$ cycles through the integers 1, ..., p-1 until the value $\Sigma(k)$ becomes at least equal to $p^{M1+1}$, at which time the p-bit $b_{M1+1,k}$ cycles through the range $0\leq b_{M1+1,k}\leq <p-1$ and the p-bit $b_{M1+2,k}$ cycles through the integers $1\leq b_{M1+2,k}\leq p-1$. Each time $b_{M1+1,k}$ changes, for example, from 0 to 1, or from p' to p'+1 ($0\leq p'\leq p-2$), the new value of the p-bit $b_{M1+1,k}$ is included in the set of p-bits $\{b_{m,k}\}$ (m=0, 1, ..., M1+1) representing the value $\Sigma(k)$. However, for the p-ary representation of all values $\Sigma(k)$ where the (M1+2)th p-bit $b_{M1+1,k}=b_{M1+1,k+1}$, the p-bit $b_{M1+1,k+1}$ is deleted from this representation, it being understood that the p-bit $b_{M1+1,k+1}$ is the same as the p-bit $b_{M1+1,k}$. Only when the p-bit $b_{M1+1,k+1}$ first differs from the p-bit $b_{M1+1,k}$, in a sequence with k increasing, is the p-bit $b_{M1+1,k+1}$ included in the p-ary representation of the value $\Sigma(k+1)$. This approach is easily extended to each integer M' satisfying $M1\leq M'\leq M$.

Figure 10:
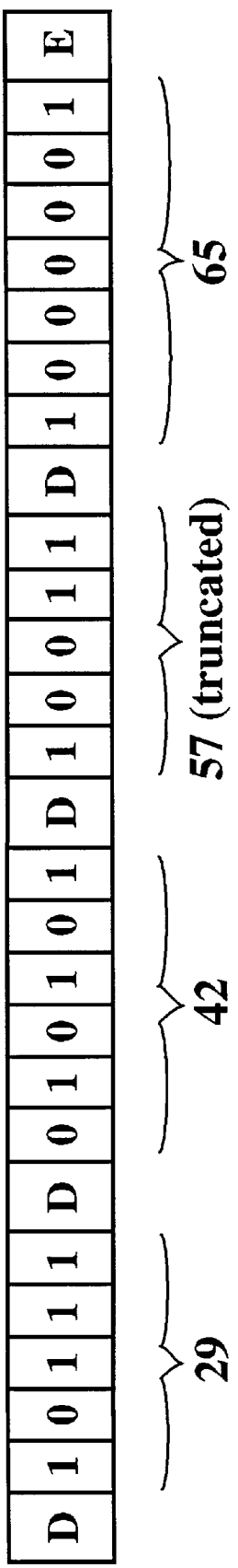

Thus, each p-ary representation for the value $\Sigma(k)$ in Eq. (15) can be reduced from M+1 p-bit coefficients to M1+1 p-bit coefficients, except at certain "p-ary transition values." A p-ary transition value is defined herein to occur at the value $\Sigma(k)$ if $\Sigma(k)$ and $\Sigma(k+1)$ have the p-ary representations $$\Sigma(k)=b_{0,k}+b_{1,k}\cdot p+b_{2,k}\cdot p^2+ \ldots +b_{M,k}\cdot p^M, \quad (15)$$

$$\Sigma(k+1)=b_{0,k+1}+b_{1,k+1}\cdot p+b_{2,k+1}\cdot p^2+ \ldots +b_{M,k+1}\cdot p^M, \quad (15')$$

and $b_{j,k}<b_{j,k+1}$ for at least one p-bit $b_{j,k}$ (j=M1+1, M1+2, ..., M). Recall that $\Sigma(k)$ is a monotonically increasing sequence in the integer k. FIG. 10 illustrates segments of a short data sequence that would be used according to this embodiment for a representative sequence $\Sigma(k)=29$, $\Sigma(k+1)=42$, $\Sigma(k+2)=57$ and $\Sigma(k+3)=65$ for the choice p=2 and M1=5, with an intermediate delimiter <D> between each two consecutive data values.

This embodiment allows exact reconstruction of an accumulated sum $\Sigma(k)$ for any value of the integer index k, from M1+1 least significant p-bits from the p-ary representation of the value $\Sigma(k)$ plus knowledge of the remaining M–M1 most-significant p-bits, which are stored in memory once and need not be repeated or re-stored each time a new sequence of p-bits is stored indelibly in memory. This approach is more complex than the preceding embodiment, because of the requirement that a user's computer keep track of the remaining M–M1 most-significant p-bits previously stored and keep track of when at least one of these M–M1 most-significant p-bits changes, at a p-ary transition value.

In another embodiment, which is a simplification of and approximation to a preceding embodiment, the instrument readout data value $N_k$ is expressed as the p-ary sum in Eq. (2), or as a sequence of the p-bits $$S(N_k)=\{a_{0,k}, a_{1,k}, \ldots, a_{M,k}\}, \quad (17)$$

with the value of the integer mantissa $p(\geq 2)$ being understood. An integer M2 satisfying $1\leq M2\leq M$ is selected, and the value $N_k$ is approximated by a truncated sequence $$S''(N_k)=\{a_{M2,k}, a_{M2+1,k}, \ldots, a_{M,k}\}, \quad (18)$$

which requires only M–M2+1 p-bits rather than M+1 p-bits. The truncated sequence $S''(N_k)$ is measured and indelibly stored as part of a truncated stored data sequence $$S''K+1=\{<N''_1><D><N''_2><D> \ldots <D><N''_{K+1}><E>\}, \quad (19)$$

where $<N''_k>$ represents the truncated p-ary string $S''(N_k)$, without the possibility of subsequent modification of any of the integers $a_{M2,k}, a_{M2+1,k}, \ldots$ or $a_{M,k}$, as an approximation to the full sequence $S(N_k)$. The actual data value $N_k$ is, in effect, approximated by the truncated value $N'_k$ given by $$N'_k=a_{M2,k}\cdot p^{M2}+a_{M2+1,k}\cdot p^{M2+1}+ \ldots +a_{M,k}\cdot p^M. \quad (20)$$

The maximum value of the numerical error $\epsilon(N'_k)$ associated with this approximation is given by $$\epsilon(N'_k;M2)_{max} = p^{M2} - 1. \quad (21)$$

The numerical error $\epsilon(N'_k;M2)$ is one-sided; that is, the error assumes only positive values. The maximum error can be reduced by about 50 percent by the following modification. First, define an error adjustment integer $$\delta(M2) = (p^{M2} - 1)/2 \quad (M2 \text{ an odd integer}) \quad (22A)$$

$$= (p^{M2})/2 \quad (M2 \text{ an even integer}). \quad (22B)$$

Now re-express the value $N_k$ by the sum $$N_k = a'_{0,k} + a'_{1,k} p + a'_{2,k} p^2 + \ldots + a'_{M,k} p^M + \epsilon(M2), \quad (23)$$

$$-p/2 \leq a'_{j,k} \leq p/2 \quad (24)$$

where the modified p-bits $a'_{j,k}$ (j=0, 1, ..., M) may now have negative as well as positive values and will generally differ from the p-bits $a_{j,k}$ used to express the data value $N_k$ itself. The value sum $N_k - \delta(M2)$ is representable by a sequence $$S(N_k - \delta(M2)) = \{a'_{0,k}, a'_{1,k}, \ldots, a'_{M,k}\} \quad (25)$$

of p-bits, but the individual modified p-bits $a'_{j,k}$ now range over an approximately symmetric interval, $-p/2 \leq a'_{j,k} \leq p/2$. The value $N_k - \delta(M2)$ is now approximated by the sum $$N''_k = a'_{M2,k} p^{M2} + a'_{M2+1,k} p^{M2+1} + \ldots + a'_{M,k} p^M, \quad (26)$$

or by the truncated sequence of modified p-bits $$S'(N''_k) = \{a'_{M2,k}, a'_{M2+1,k}, \ldots, a'_{M,k}\}, \quad (27)$$

where M2 is again a selected integer in the range $1 \leq M2 < M$.

The numerical error $\epsilon''(N_k;M2)$ in the approximation of the value $N_k$ by the sequence $S'(N''_k)$ of r-numbers can assume positive and negative values with approximately equal probability, and the maximum and minimum numerical errors associated with the approximation $S'(N''_k)$ are given by $$\epsilon(N'_k;M2)_{min} \geq -\delta(M2), \quad (28)$$

$$\epsilon(N'_k;M2)_{max} \leq +\delta(M2). \quad (29)$$

The essence of the re-approximation introduced through use of Eqs. (22A) and (22B) is that an error adjustment integer $\delta(M2)$ is subtracted from any value $N_k$ and this difference, $N_k - \delta(M2)$, is then approximated by a truncated sequence $S'(N''_k)$, and the numerical error associated with this truncation is approximately symmetrically distributed around the error value 0. Choices of the subtracted value $\delta(M2)$, other than as defined in Eqs. (22A) and (22B), can also be made that will reduce the maximum error as calculated in Eq. (21).

FIG. 11 illustrates a short sequence of data values treated according to this embodiment for the values $N_k=14$, $N_{k+1}=53$, and $N_{k+2}=36$, for the choices p=2 and M2=4, with an intermediate delimiter <D> between each two consecutive data values.

The approach of this embodiment may be applied by analogy to the accumulated sum of values $\Sigma(K1;K2)$ and $\Sigma(k)$ defined in Eqs. (13) and (14) to provide another embodiment. The accumulated sum $\Sigma(k)$ is expressed as the p-ary expression in Eq.(15), or the displaced accumulated sum $\Sigma(k) - \delta(M2)$ is expressed as a modified p-ary expression $$\Sigma(k) - \delta(M2) = b'_{0,k} + b'_{1,k} p + b'_{2,k} p^2 + \ldots + b'_{M,k} p^M, \quad (30)$$

$$-p/2 \leq b'_{j,k} \leq p/2. \quad (31)$$

The accumulated sum $\Sigma(k)$ is then approximated by a truncated accumulated sum $$\Sigma''(k) - \delta(M2) = b'_{M2,k} p^{M2} + b'_{M2+1,k} p + b'_{2,k} p^2 + \ldots + b'_{M,k} p^M, \quad (32)$$

with an associated truncated coefficient sequence $$S''(\Sigma(k)) = \{b'_{M2,k}, b'_{M2+1,k}, \ldots, b'_{M,k}\}, \quad (33)$$

by analogy with a preceding embodiment, and the minimum and maximum numerical errors introduced by use of the truncated sequence $S'(\Sigma(k))$ are $$\epsilon(\Sigma(k);M2)_{min} \geq -\delta(M2) \quad (34)$$

$$\epsilon(\Sigma(k);M2)_{max} \leq +\delta(M2). \quad (35)$$

Several embodiments for indelible storage of instrument values and accumulated sums of instrument values have been presented here. Two of these embodiments are exact but are rather complex to apply. Two of these embodiments are approximations, with a maximum error magnitude of $\delta(M2)$. In the last two of these embodiments, the intermediate and end delimiter sequences <D> and <E> are optionally deleted from the sequence $S_K$ shown in Eq. (8), because the number of p-bits used in the approximation to each data value $N_k$ (or $N''_k$) is fixed at M–M1+1 and does not vary with the size of the data value.

In a simpler alternative to these third and/or fourth embodiments, the integer M2 in Eqs. (17) and (18) may be set equal to zero so that the "approximation" becomes exact. In this approach, the instrument incremental reading or cumulative reading is exactly represented by an array of M+1 p-ary bits, and each reading is preferably arranged chronologically in a sequence. Because each reading uses precisely M+1 bits and the sequence of instrument readings is ordered, use of an intermediate delimiter <D> or of an end delimiter <E> is optional here.

The p-bits representing each new data value $N_k$, accumulated data value sum $\Sigma(k)$, approximated data value $N''_k$ or accumulated data value sum $\Sigma''(k)$ are "burned in" or otherwise indelibly entered into a memory unit, using the intermediate and end delimiters <D> and <E> to separate any two consecutive data values. Proceeding in this manner, the data values read out from the instrument or otherwise measured or generated are indelibly entered and cannot be subsequently modified without destroying an essential part of the instrument.

Figure 12:
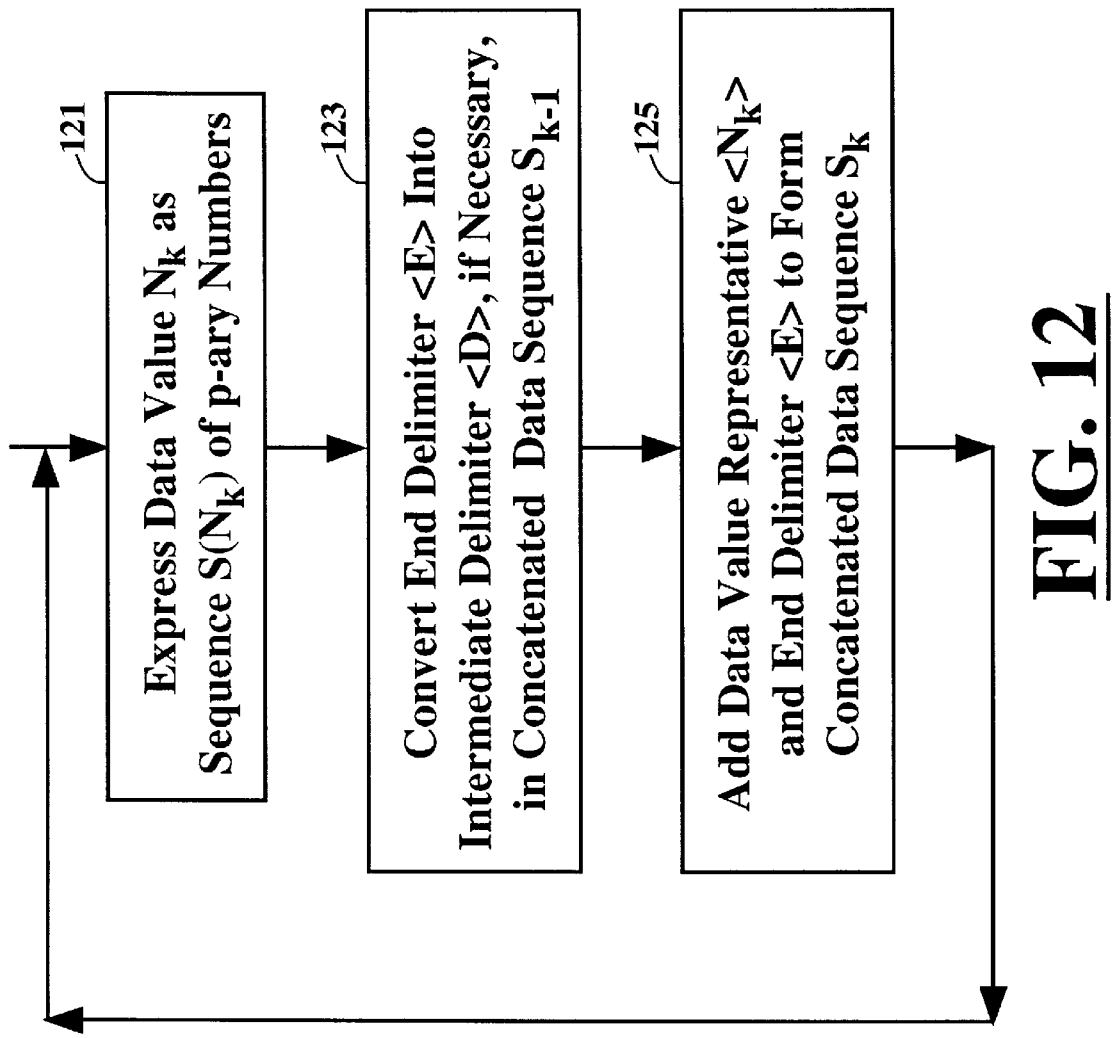

FIG. 12 illustrates practice of an exact approach embodiment here, involving Eqs. (3)–(12). In step 121, a (new) data value $N_k$ is expressed as a sequence $S(N_k)$ or $S'(N_k)$ of p-ary numbers, as in Eqs. (4) and (8). In step 123, an end delimiter <E> in the concatenated representation $S_{k-1}$ of the first k–1 data values (Eq. (12)) is converted to an intermediate delimiter <D>, if this conversion is necessary. In step 125, the data value representative $<N_k>$ for the data value $N_k$ and an end delimiter <E> are added to the representation $S_{k-1}$ to form a new concatenated representation $S_k$.

Optionally, the system then recycles to step 121 to process another (new) data value. FIG. 12 also illustrates practice of the third embodiment, where the exact p-ary representation of the data value $N_k$ is replaced by an approximate data value in which some bits are deleted in the representation of the data value $N_k$ are deleted.

Figure 13:
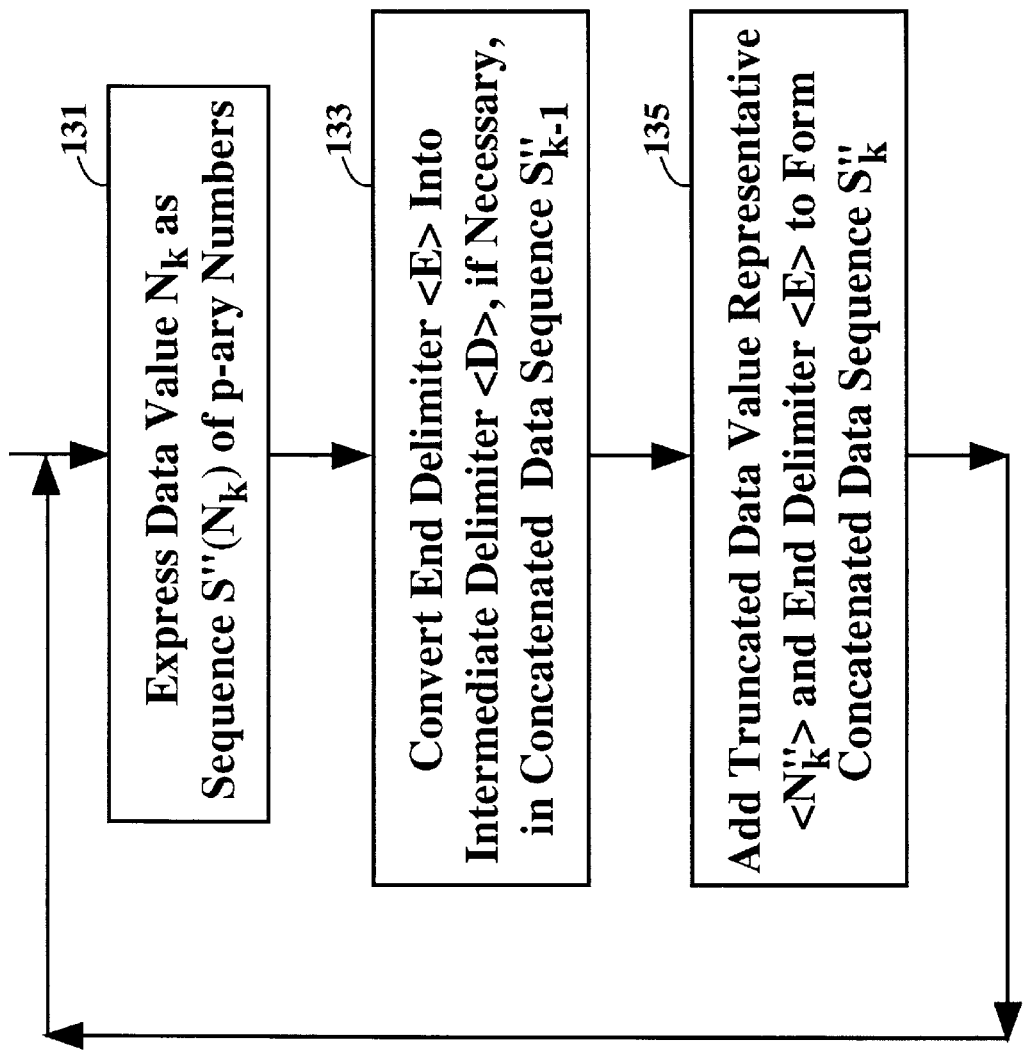

FIG. 13 illustrates practice of an approximate approach embodiment here, involving Eqs. (13)–(16). In step 131, a (new) data value $N_k$ is expressed as a truncated sequence $S''(N_k)$ of p-ary numbers, as in the discussion of Eqs. (15) and (15'). In step 133, an end delimiter <E> in the concatenated truncation representation $S''_{k-1}$ of the first k−1 data values is converted to an intermediate delimiter <D>, if this conversion is necessary. In step 135, the truncated data value representative <$N''_k$> for the truncated data value $N''_k$ and an end delimiter <E> are added to the truncation representation $S''_{k-1}$ to form a new concatenated truncation representation $S''_k$. Optionally, the system then recycles to step 131 to process another (new) data value. FIG. 13 also illustrates practice of the fourth embodiment, where the exact p-ary truncation representation of the data value $N_k$ is replaced by an approximate data value, $N''_k$, in which some data bits in the representation of the data value $N_k$ are deleted.

Another embodiment of the invention is applicable to an instrument, such as an odometer, that provides a sequence of output pulses for each selected unit of "usage," such as each 0.1 or 0.5 of a mile or kilometer that is traveled by a vehicle in which the odometer is installed. As each pulse is received by the computer, a single memory bit or a selected and distinctive array of memory bits is burned into a memory module to form a column, row or other array, preferably consecutive, of burned in bits. Optionally, the computer may also use a delimiter, such as another selected pattern of burned in bits, to mark each place in memory where (1) the instrument (or vehicle engine) was turned off or otherwise disengaged or (2) the instrument remained on but produced no usage pulses for at least a selected threshold time such as 60–300 sec, to account for the possibility that the instrument was in an idle mode for this time interval. When an observer wishes to check on the cumulative usage (or mileage) experience by the instrument, the computer or another instrument counts the number of burned in bits or burned in bit arrays in the memory; or, optionally, counts the number of burned in bits between any two consecutive delimiters among the memory bits.

Alternatively, the memory bits may be initially presented in an erased or initial state. As each usage pulse is received, a memory bit or selected group of memory bits that is initially in an erased or unactivated state is converted to a marked or activated state or marked state array of bits (preferably in a consecutive array of marked memory bits); and once a memory bit is converted to a marked state or marked state array, that memory bit or marked state array cannot be subsequently altered to some other state.

When the memory is filled with a array of burned in or activated bits (and delimiters, if these are utilized), the memory module can be replaced by another memory module and the burn-in process can continue. Optionally, the cumulative number of burned in bits from all preceding memory modules that were filled can be entered separately as additional information when a new memory module is installed.

A data parameter value can be "burned in" or otherwise stored in an unalterable manner using a one-time-programmable (OTP) memory module or a write-once-read-many-times (WORM) memory module. Another possibility, which may be less satisfactory for this purpose, uses a standard memory module and accompanies each data parameter value written into memory with one or more stored checksums computed using this data parameter value, according to one of the three checksum approaches discussed above in connection with FIG. 2. If a checksum approach is used, it may be preferable to use a checksum that allows reconstruction of the entire data parameter value, in the event that the stored data parameter value is altered and must be recovered.

What is claimed is:

1. A method for storage of digital data in a form so that subsequent alteration of that data can be detected, the method comprising:

receiving a sequence of at least two distinct digital data values that relate to operation of an instrument, and representing each data value as an ordered sequence of alphanumeric characters;

processing the sequence and expressing each data value as a plurality of usage data fields representing instrument usage data for a selected time interval: (1) a measure of usage of the instrument in the selected time interval; and at least one of (2A) an estimate of operating time that the instrument was operated within the selected time interval and (2B) an estimate of accumulated time the instrument was operated within the selected time interval at a usage level within a selected usage level interval;

storing the instrument usage data field and at least one of the instrument operating time and the instrument accumulated time in a digital memory in separate locations;

providing and storing a first error detection checksum for at least one selected usage data value in at least one of the usage data fields for the selected time interval at the time the at least one selected usage data value is stored interval memory;

computing a second error checksum for the at least one selected usage data value, and comparing the first and second error checksums for the at least one selected usage data value; and when the first and second error checksums do not agree, interpreting this as indicating that at least one of the usage data fields for the selected time interval has been altered.

2. The method of claim 1, further comprising:

selecting said instrument to provide a measure of distance traveled by a vehicle on which said instrument is mounted; and selecting said measure of usage to be a measured distance traveled by the vehicle.

3. A method for storage of digital data in a form so that subsequent alteration of that data can be detected, the method comprising the steps of:

storing an initial value of a sum of data value increments in unencrypted form and in encrypted form;

receiving a sequence of at least two distinct digital data values that relate to operation of an instrument, and representing each data value as an ordered sequence of alphanumeric characters;

accumulating a series of received data values as a data value increment;

when the value of the data value increment exceeds a selected threshold value, (1) adding the data value increment to the sum of values in unencrypted form and storing the resulting sum as a data value sum in unencrypted form, and (2) adding the data value increment to the sum of values in encrypted form and storing the resulting sum as a data value sum in encrypted form;

comparing the value of at least one data value sum in unencrypted form to the value of the corresponding decrypted value of the data value sum stored in encrypted form; and when the value of the at least one data value sum in unencrypted form and the value of the corresponding data value sum in encrypted form do not substantially agree with each other, indicating that at least one of the data value sums in unencrypted form may have been altered.

4. The method of claim 3, further comprising selecting said digital data values to represent trip mileage for a selected trip, as determined by a vehicle odometer.

5. A method for storage of digital data in a form that cannot be subsequently altered, the method comprising:

receiving a sequence of at least two distinct digital data values, and representing each data value as an ordered sequence of at most M+1 integers, with each integer lying in a selected interval of integers, where M is a selected positive integer;

selecting an intermediate delimiter sequence D of integers drawn from a selected collection of characters and an end delimiter sequence E of integers drawn from the selected collection of characters, where the sequence of characters representing the delimiter sequence D and the sequence of characters representing the delimiter sequence E differ from each other and from all possible sequences of integers representing a data value;

storing a sequence of integers representing each data values in a memory having a plurality of memory elements as a concatenated sequence of integers, where each two consecutive data value sequences are separated by at least one intermediate delimiter sequence, where a memory element cannot be altered after the memory element is initially activated; and placing a selected end delimiter after a last data value in the sequence of the data values, where the end delimiter is a sequence of Q alphanumeric characters, the end delimiter sequence is not found in any sequence representing a data value, the intermediate delimiter sequence is a sequence of R alphanumeric characters, and Q and R are selected positive integers satisfying Q+1≦R.

6. The method of claim 5, further comprising:

selecting said end delimiter sequence to be a subsequence of Q consecutive alphanumeric characters in said intermediate delimiter sequence.

7. The method of claim 5, further comprising selecting said digital data values to represent trip mileage for a selected trip, as determined by a vehicle odometer.

8. A method for storage of digital data in a form that cannot be subsequently altered, the method comprising:

receiving a sequence of at least two distinct digital data values, and expressing each data value as an ordered sequence of M alphanumeric characters, from a least significant character to a most significant character, where M is a selected integer greater than 1;

for a selected positive integer M2 that is less than or equal to M, representing each data value by an ordered approximate sequence of M2 consecutive characters drawn from the ordered sequence of M characters representing the data value;

separating any two consecutive approximate sequences representing data values by a selected intermediate delimiter sequence that is an ordered sequence of alphanumeric characters and the intermediate delimiter sequence is not found in any approximate sequence representing a data value;

storing at least two consecutive approximate sequences representing data values and an intermediate delimiter sequence separating the two approximate sequences in a memory having a plurality memory elements, with each memory element representing an alphanumeric character, where a memory element cannot be altered after the memory element is initially activated; and placing a selected end delimiter after a last data value in the sequence of the data values, where the end delimiter is a sequence of Q alphanumeric characters, the end delimiter sequence is not found in any approximate sequence representing a data value, the intermediate delimiter is a sequence of R alphanumeric characters, and Q and R are selected positive integers satisfying Q+1≦R.

9. The method of claim 8, further comprising:

selecting said end delimiter sequence to be a subsequence of Q consecutive alphanumeric characters in said intermediate delimiter sequence.

10. The method of claim 8, further comprising selecting said integer M2 to be equal to M.

11. The method of claim 8, further comprising selecting said integer M2 to be no larger than M−1.

12. The method of claim 8, further comprising selecting said digital data values to represent trip mileage for a selected trip, as determined by a vehicle odometer.

13. Apparatus for storage of digital data in a form so that subsequent alteration of that data can be detected, the apparatus comprising:

a computer that is programmed:

to store an initial value of a sum of data value increments in unencrypted form and in encrypted form;

to receive a sequence of at least two distinct digital data values that relate to operation of an instrument, and to represent each data value as an ordered sequence of alphanumeric characters;

to accumulate a series of received data values as a data value increment;

when the value of the data value increment exceeds a selected threshold value, (1) to add the data value increment to the sum of values in unencrypted form and storing the resulting sum as a data value sum in unencrypted form, and (2) to add the data value increment to the sum of values in encrypted form and storing the resulting sum as a data value sum in encrypted form;

to compare the value of at least one data value sum in unencrypted form to the value of the corresponding decrypted value of the data value sum in encrypted form; and when the value of the at least one data value sum in unencrypted form and the value of the corresponding data value sum in encrypted form do not substantially agree with each other, to indicate that at least one of the data value sums in unencrypted form may have been altered.

14. Apparatus for storage of digital data in a form so that subsequent alteration of that data can be detected, the apparatus comprising:

a computer that is programmed:

to store an initial value of a sum of data value increments in a memory;

to receive a sequence of at least two distinct digital data values that relate to operation of an instrument, and to represent each data value as an ordered sequence of alphanumeric characters;

to accumulate a series of received data values as a data value increment;

when the value of the data value increment exceeds a selected threshold value, (1) to add the data value increment to the sum of values to form a resulting new sum of values, (2) to compute at least one error checksum for the new sum value, (3) to store the new sum value and the at least one error checksum;

to compute an error checksum for at least one stored data value sum and to compare the computed error checksum with a corresponding stored error checksum for the stored data value sum; and when the computed error checksum and the stored error checksum do not substantially agree with each other, to indicate that at least one of the data value sums has been altered.

15. Apparatus for storage of digital data in a form that cannot be subsequently altered, the apparatus comprising:

a computer that is programmed:

to receive a sequence of at least two distinct digital data values, and to represent each data value as an ordered sequence of at most M+1 integers, with each integer lying in a selected interval of integers, where M is a selected positive integer;

to select an intermediate delimiter sequence D of integers drawn from the selected interval of integers and an end delimiter sequence E of integers drawn from the selected interval of integers, where the sequence of integers representing the delimiter sequence D and the sequence of integers representing the delimiter sequence E differ from each other and from all possible sequences of integers representing a data value; and to store a sequence of integers representing each data values in a memory having memory elements as a concatenated sequence of integers, where each two consecutive data value sequences are separated by at least one intermediate delimiter sequence, where a memory element cannot be altered after the memory element is initially activated.

16. Apparatus for storage of digital data in a form that cannot be subsequently altered, the apparatus comprising:

a computer that is programmed:

to receive a sequence of at least two distinct, increasing digital data values, and to represent each data value as an ordered sequence of M alphanumeric characters, where M is a selected integer greater than one;

to represent each data value after the first data value in the sequence by a truncated sequence of at least M1 consecutive alphanumeric characters used to represent the data value by the M alphanumeric characters, where M1 is a selected positive integer that is less than M, where the truncated sequence representing the data value is the M1 least significant characters representing the data value in the ordered sequence of M characters and the remaining M−M1 characters in the ordered sequence have all been determined by one or more preceding members of the sequence of data values;

to separate any two consecutive truncated sequences representing data values by a selected intermediate delimiter that is an ordered sequence of alphanumeric characters and the intermediate delimiter sequence is not found in any sequence representing a data value; and to store at least two consecutive truncated sequences representing data values and an intermediate delimiter separating the two truncated sequences in a memory having a plurality memory elements, with each memory element representing an alphanumeric character, where a memory element cannot be altered after the memory element is initially activated.

17. Apparatus for storage of digital data in a form that cannot be subsequently altered, the apparatus comprising:

a computer that is programmed:

to receive a sequence of at least two distinct digital data values, and expressing each data value as an ordered sequence of M alphanumeric characters, from a least significant character to a most significant character, where M is a selected integer greater than 1;

for a selected positive integer M2 that is less than or equal to M, to represent each data value by an ordered approximate sequence of M2 consecutive characters drawn from the ordered sequence of M characters representing the data value;

to separate any two consecutive approximate sequences representing data values by a selected intermediate delimiter sequence that is an ordered sequence of alphanumeric characters and the intermediate delimiter sequence is not found in any approximate sequence representing a data value; and to store at least two consecutive approximate sequences representing data values and an intermediate delimiter sequence separating the two approximate sequences in a memory having a plurality memory elements, with each memory element representing an alphanumeric character, where a memory element cannot be altered after the memory element is initially activated.

* * * * *